(12) United States Patent
Lee et al.

(10) Patent No.: US 12,340,136 B2
(45) Date of Patent: Jun. 24, 2025

(54) DISPLAY APPARATUS AND METHOD OF OPERATING THE SAME

(71) Applicant: SAMSUNG ELECTRONICS CO., LTD., Suwon-si (KR)

(72) Inventors: Jongin Lee, Suwon-si (KR); Sehyun Kim, Suwon-si (KR); Yongwoo Shin, Suwon-si (KR); Junyoung Choi, Suwon-si (KR); Hyeeun Park, Suwon-si (KR); Kilsoo Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/368,985

(22) Filed: Sep. 15, 2023

(65) Prior Publication Data

US 2024/0004601 A1 Jan. 4, 2024

Related U.S. Application Data

(63) Continuation of application No. PCT/KR2023/009030, filed on Jun. 28, 2023.

(30) Foreign Application Priority Data

Jun. 28, 2022 (KR) .................. 10-2022-0079238
Nov. 10, 2022 (KR) .................. 10-2022-0149689

(51) Int. Cl.
*G06F 3/14* (2006.01)
*A63F 13/23* (2014.01)
(Continued)

(52) U.S. Cl.
CPC ............... *G06F 3/14* (2013.01); *A63F 13/23* (2014.09); *A63F 13/52* (2014.09); *G06F 3/0482* (2013.01)

(58) Field of Classification Search
CPC ......... G09G 5/14; G06F 3/0482; A63F 13/52; A63F 13/23
See application file for complete search history.

(56) References Cited

U.S. PATENT DOCUMENTS 11,050,828 B2 * 6/2021 Yoon ..................... H04L 67/125
11,533,530 B2 * 12/2022 Arling ................ H04N 21/4852
(Continued)

FOREIGN PATENT DOCUMENTS

| JP | 2004-207931 A | 7/2004 |
|---|---|---|
| JP | 2004-283485 A | 10/2004 |

(Continued)

OTHER PUBLICATIONS

Gamepad, W3C Working Draft, Apr. 13, 2023, 25 pages, www.w3.org_TR_gamepad.

(Continued)

*Primary Examiner* — Doon Y Chow
(74) *Attorney, Agent, or Firm* — Sughrue Mion, PLLC

(57) ABSTRACT

Provided are a display apparatus and a method of operating the display apparatus. The display apparatus is configured to convert an input signal from a device controller into a control signal, identify an operation mode of the display apparatus as one of a menu mode for changing settings of the display apparatus and a content play control mode for controlling content displayed on the display, identify a control target device based on the identified operation mode; process the control signal based on the identified control target device and transmit the processed control signal to the control target device.

16 Claims, 16 Drawing Sheets

(51) Int. Cl.
*A63F 13/52* (2014.01)
*G06F 3/0482* (2013.01)

(56) References Cited

U.S. PATENT DOCUMENTS

| | | | | |
|---|---|---|---|---|
| 11,640,760 | B2* | 5/2023 | Arling | G08C 19/28 |
| | | | | 340/12.54 |
| 11,687,217 | B2* | 6/2023 | Hatambeiki | G08C 23/04 |
| | | | | 715/737 |
| 11,687,993 | B2* | 6/2023 | Ogaz | G06Q 50/01 |
| | | | | 705/26.7 |
| 11,778,100 | B2* | 10/2023 | Stepanian | G06F 1/1626 |
| | | | | 455/414.1 |
| 2006/0245097 | A1* | 11/2006 | Chang | H04N 21/42204 |
| | | | | 360/1 |
| 2010/0222146 | A1 | 9/2010 | Evans et al. | |
| 2013/0113698 | A1 | 5/2013 | Kuroume et al. | |
| 2017/0366778 | A1* | 12/2017 | Kim | H04N 21/43615 |
| 2023/0048793 | A1 | 2/2023 | Lee et al. | |

FOREIGN PATENT DOCUMENTS

| | | |
|---|---|---|
| KR | 10-2006-0112531 A | 11/2006 |
| KR | 10-0781509 B1 | 12/2007 |
| KR | 10-0828931 B1 | 5/2008 |
| KR | 10-2013-0013330 A | 2/2013 |
| KR | 10-2015-0055288 A | 5/2015 |
| KR | 10-2017-0143406 A | 12/2017 |
| KR | 10-2021-0029002 A | 3/2021 |
| WO | 2023/017989 A1 | 2/2023 |

OTHER PUBLICATIONS

International Search Report & Written Opinion (PCT/ISA/210 & 237) dated Sep. 20, 2023 in International Application No. PCT/KR2023/009030.

* cited by examiner

FIG. 6

STANDARDIZED CONTROL SIGNAL–APPLICATION
CONTROL SIGNAL CONVERSION TABLE

- 600
- 610 STANDARDIZED CONTROL SIGNAL–FIRST APPLICATION CONTROL SIGNAL CONVERSION TABLE
- 620 STANDARDIZED CONTROL SIGNAL–SECOND APPLICATION CONTROL SIGNAL CONVERSION TABLE
- 630 STANDARDIZED CONTROL SIGNAL–THIRD APPLICATION CONTROL SIGNAL CONVERSION TABLE

EXAMPLE OF STANDARDIZED CONTROL SIGNAL–APPLICATION CONTROL SIGNAL CONVERSION TABLE

| STANDARDIZED CONTROL SIGNAL | FIRST APPLICATION CONTROL SIGNAL | SECOND APPLICATION CONTROL SIGNAL | THIRD APPLICATION CONTROL SIGNAL |
|---|---|---|---|
| S1 | aaaa1 | bbbb1 | cccc1 |
| S2 | aaaa2 | bbbb2 | cccc2 |
| S3 | aaaa3 | bbbb3 | cccc3 |
| S4 | aaaa4 | bbbb4 | cccc4 |
| S5 | aaaa5 | bbbb5 | cccc5 |
| S6 | aaaa6 | bbbb6 | cccc6 |
| S7 | aaaa7 | | cccc7 |

DISPLAY APPARATUS AND METHOD OF OPERATING THE SAME

CROSS-REFERENCE TO RELATED APPLICATIONS

This application is a bypass continuation of International Application No. PCT/KR2023/009030, filed on Jun. 28, 2023, which is based on and claims priority to Korean Patent Application No. 10-2022-0079238, filed on Jun. 28, 2022, and Korean Patent Application No. 10-2022-0149689, filed on Nov. 10, 2022, the disclosures of which are incorporated by reference herein in their entireties.

BACKGROUND

1. Field

The disclosure relates to a display apparatus and a method of operating the same, and more particularly, to a display apparatus to which a display and a device controller may be conveniently connected and a method of operating the display apparatus.

2. Description of Related Art

Recently, the number of game users has increased and the demand for enjoying game content on a large-screen television (TV) for immersive feeling of the game has increased.

However, playing games through a TV simply involves controlling a game console by using a game controller specified for the game console, and the TV only receives and displays gameplay images performed according to the control by the game controller. Therefore, despite the variety of game consoles that may be connected to the TV and the variety of game controllers, a user is still only capable of being provided with each game console and a corresponding game controller and directly controlling the game console by using the game controller.

For the growing demand for games and the convenience of gameplay users, there is a need for a method of controlling devices such as the game console and the device controller such as the game controller actively on a TV.

SUMMARY

Provided is a display apparatus capable of conveniently connecting a device and a device controller that are connected to the display apparatus to each other, and a method of operating the display apparatus.

According to an aspect of the disclosure, a display apparatus includes: a display; a memory configured to store at least one instruction; and a processor configured to execute the at least one instruction to: convert an input signal from a device controller into a control signal, identify an operation mode of the display apparatus as one of a menu mode for changing settings of the display apparatus or a content play control mode for controlling content displayed on the display, identify a control target device based on the identified operation mode, process the control signal based on the identified control target device, and transmit the processed control signal to the control target device.

The processor may be further configured to execute the at least one instruction to: identify identification information of the device controller, and convert the input signal from the device controller into the control signal based on a specified standard using a conversion table corresponding to the identification information of the device controller.

The processor may be further configured to execute the at least one instruction to: identify the operation mode as the menu mode based on a menu screen for changing settings of the display apparatus being located at least partially in a foreground, and identify the operation mode as the content play control mode based on a content screen being displayed in the foreground.

The processor may be further configured to execute the at least one instruction to: identify the control target device as the display apparatus based on the identified operation mode being the menu mode, and process the control signal to be used in the display apparatus.

The processor may be further configured to execute the at least one instruction to: convert the control signal into a display apparatus control signal, and control the display apparatus according to the display apparatus control signal.

The processor may be further configured to execute the at least one instruction to: identify the control target device as an external electronic device that provides the content displayed on the display based on the identified operation mode being the content play control mode, and process the control signal to for the external electronic device.

The processor may be further configured to execute the at least one instruction to: based on the identified operation mode being the content play control mode, identify whether the control signal converted from the input signal of the device controller corresponds to a preset key value, and based on the control signal corresponding to the preset key value, control a menu screen for changing settings of the display apparatus to operate in the menu mode.

The processor may be further configured to execute the at least one instruction to: transmit the control signal to the external electronic device based on an application executing the content displayed on the display being compatible with the control signal, and convert the control signal using a conversion table corresponding to the application executing the content and transmit the converted control signal to the external electronic device, based on the application executing the content displayed on the display not being compatible with the control signal.

The processor may be further configured to execute the at least one instruction to: identify whether an application executing the content displayed on the display is compatible with the device controller, and transmit the input signal from the device controller to the external electronic device based on the application executing the content being compatible with the device controller.

According to an aspect of the disclosure, a method of operating a display apparatus includes: converting an input signal from a device controller into a control signal; identifying an operation mode of the display apparatus as one of a menu mode for changing settings of the display apparatus or a content play control mode for controlling content displayed on a display; identifying a control target device based on the identified operation mode, processing the control signal based on the identified control target device and transmitting the processed control signal to the control target device.

The method may further include identifying identification information of the device controller; and converting the input signal from the device controller into the control signal based on a specified standard using a conversion table corresponding to identification information of the device controller.

The method may further include identifying the operation mode as the menu mode based on a menu screen for changing settings of the display apparatus being located at least partially in a foreground, and identifying the operation mode as the content play control mode based on a content screen being displayed in the foreground.

The method may further include identifying the control target device as the display apparatus based on the identified operation mode being the menu mode; and processing the control signal to be used in the display apparatus.

The method may further include converting the control signal into a display apparatus control signal, and controlling the display apparatus according to the display apparatus control signal.

The method may further include identifying the control target device as an external electronic device that provides the content displayed on the display, based on the identified operation mode being the content play control mode; and processing the control signal to be used in the external electronic device.

The method may further include, based on the identified operation mode being the content play control mode, identifying whether the control signal converted from the input signal of the device controller corresponds to a preset key value; and based on the control signal corresponding to the preset key value, controlling a menu screen for controlling the display apparatus to operate in the menu mode.

The method may further include transmitting the control signal to the external electronic device based on an application executing the content displayed on the display being compatible with the control signal; and converting the control signal using a conversion table corresponding to the application executing the content and transmitting the converted control signal to the external electronic device, based on the application executing the content displayed on the display not being compatible with the control signal.

The method may further include identifying whether an application executing the content displayed on the display is compatible with the device controller; and transmitting the input signal from the device controller to the external electronic device based on the application executing the content being compatible with the device controller.

According to an aspect of the disclosure, a non-transitory computer-readable recording medium having recorded thereon one or more programs executable by a processor of a display apparatus for implementing a method of operating the display apparatus includes: converting an input signal from a device controller into a control signal; identifying an operation mode of the display apparatus as one of a menu mode for changing settings of the display apparatus or a content play control mode for controlling content displayed on a display; identifying a control target device based on the identified operation mode, processing the control signal based on the identified control target device; and transmitting the processed control signal to the identified control target device.

According to an aspect of the disclosure, a display apparatus includes: a memory configured to store at least one instruction; and a processor configured to execute the at least one instruction stored in the memory to: convert a first signal into a standardized control signal, identify an operation mode of the display apparatus, and process the standardized control signal based on a control target device corresponding to the identified operation mode and transmit the processed standardized control signal to the control target device.

The processor may be further configured to execute the at least one instruction to: identify identification information of a device controller, and convert the first signal from the device controller into the standardized control signal based on a conversion table corresponding to the identification information of the device controller.

The processor may be further configured to execute the at least one instruction to: identify the operation mode as a menu mode based on a menu screen for changing settings of the display apparatus being located at least partially in a foreground, and identify the operation mode as a content play control mode based on a content screen being displayed in the foreground.

The processor may be further configured to execute the at least one instruction to: identify the control target device as the display apparatus based on the identified operation mode being a menu mode, and process the standardized control signal to be used in the display apparatus.

According to one or more embodiments of the disclosure, user convenience may be improved by conveniently connecting and controlling a device that is used by connecting to a display apparatus and a device controller.

According to one or more embodiments of the disclosure, the user may access various devices and servers by using one device controller.

According to one or more embodiments of the disclosure, users may stay more frequently and longer in a game hub provided by the display apparatus, and thus, utilization efficiency of the display apparatus may be improved.

BRIEF DESCRIPTION OF THE DRAWINGS

The above and other aspects, features, and advantages of embodiments of the disclosure will be more apparent from the following description taken in conjunction with the accompanying drawings, in which:

FIG. 6 is a diagram showing an example of a table for converting a standardized control signal into an application control signal, according to an embodiment of the disclosure;

DETAILED DESCRIPTION

Figure 1:
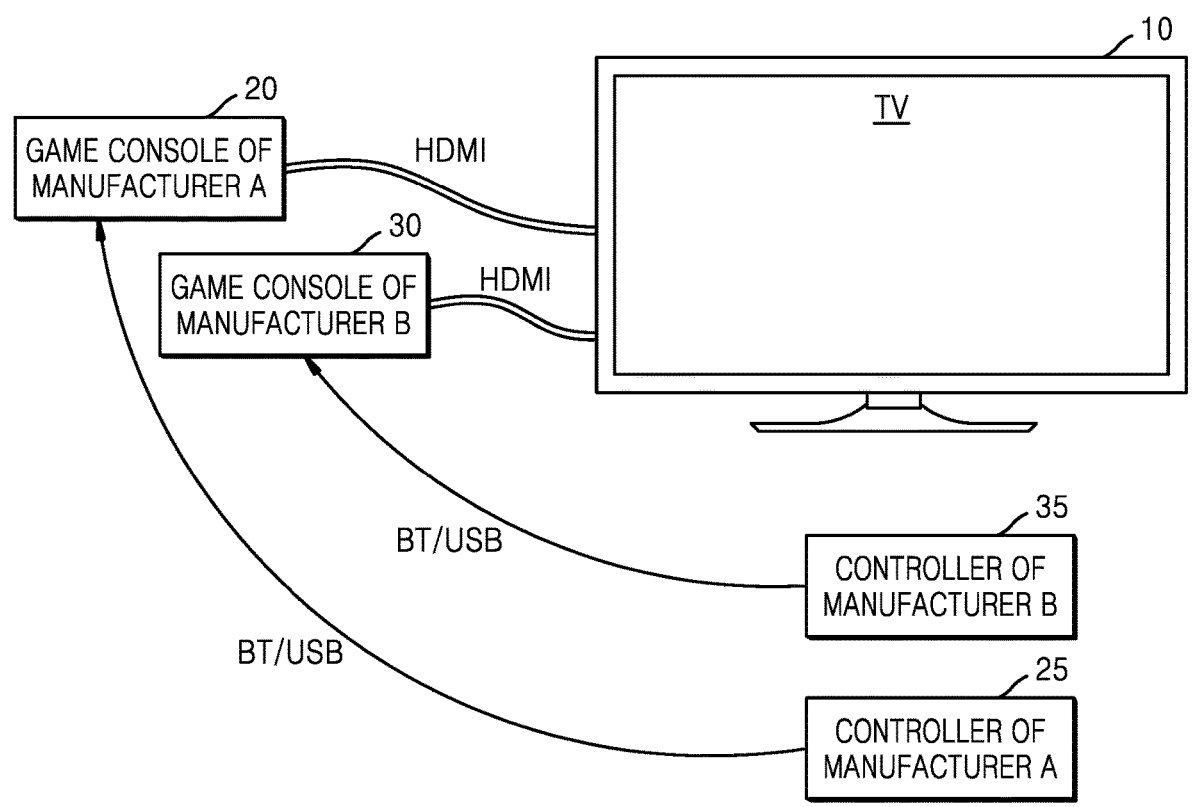
FIG. 1 is a reference diagram for describing an aspect of using game content through a TV according to the related art.

Throughout the disclosure, the expression "at least one of a, b or c" indicates only a, only b, only c, both a and b, both a and c, both b and c, or all of a, b, and c.

The terminology used herein will be described briefly, and the disclosure will be described in detail.

All terms including descriptive or technical terms which are used herein should be construed as having meanings that are obvious to one of ordinary skill in the art. However, the terms may have different meanings according to an intention of one of ordinary skill in the art, precedent cases, or the appearance of new technologies. Also, some terms may be arbitrarily selected by the applicant. The meaning of the selected terms will be described in the detailed description. Thus, the terms used herein have to be defined based on the meaning of the terms together with the description throughout the specification.

It will be further understood that the terms "comprises" and/or "comprising," when used in this specification, specify the presence of stated components, but do not preclude the presence or addition of one or more components. In addition, the terms such as " . . . unit", "module", etc. provided herein indicates a unit performing at least one function or operation, and may be realized by hardware, software, or a combination of hardware and software.

Hereinafter, the disclosure will be described in detail with reference to accompanying drawings to the extent that one of ordinary skill in the art would be able to carry out the disclosure. However, the disclosure may be implemented in various manners, and is not limited to the embodiment of the disclosure described herein. In addition, components irrelevant with the description are omitted in the drawings for clear description, and like reference numerals are used for similar components throughout the entire specification.

According to one or more embodiments, the term "user" denotes a person controlling functions or operations of a computing device or an electronic device by using a control device, and may include a viewer, a manager, or an installation technician.

FIG. 1 is a reference diagram for describing an aspect of using game content through a TV, according to the related art.

Referring to FIG. 1, a plurality of game consoles manufactured by a plurality of manufacturers may be connected to a TV 10. For example, a game console 20 of a manufacturer A and a game console 30 of a manufacturer B may be connected to the TV 10 via an interface such as a high-definition multimedia interface (HDMI), etc. A user may display game images transmitted from the game console 20 of the manufacturer A via the TV 10 by connecting the game console 20 of the manufacturer A to the TV 10 or may play game content after displaying game images transmitted from the game console 30 of the manufacturer B on the TV 10 by connecting the game console B of the manufacturer B, in order to play the game content on the TV having a large-sized screen. Each game console manufacturer sells a controller that may be used along with the game console of their own, and thus, in order to play the game content by using the game console 20 of the manufacturer A, a controller 25 of the manufacturer A has to be used. Also, in order for the user to play the game content by using the game console B of the manufacturer B, a controller 35 of the manufacturer B has to be used. The game console of each manufacturer and the corresponding game controller may be connected via, for example, Bluetooth or universal serial bus (USB) communication. In general, the game controllers from different manufacturers are not compatible with each other, and thus, the user has to control the game console of each manufacturer by using the game controller of the corresponding manufacturer. Therefore, the user may not control the game console 30 of the manufacturer B by using the controller 35 of the manufacturer A and may not control the game console 20 of the manufacturer A by using the controller 25 of the manufacturer B. Therefore, even when the game content is played through the large-screen of the TV 10, the user still has to play the game by using a pair of the game console of the manufacturer A-the controller of the manufacturer A or a pair of the game console of the manufacturer B-the controller of the manufacturer B. Therefore, an efficiency of utilizing the media such as TV inevitably degrades.

Also, although the TV 10 receives and displays the game image from the game console 20 of the manufacturer A, the TV 10 simply receives and displays only the game image played by the game console 20 of the manufacturer A, and the game image is controlled via the game controller 25 of the manufacturer A. In addition, the control signal from the game controller 25 of the manufacturer A is directly transferred to the game console 20 of the manufacturer A, and thus, calculation or operation corresponding to the control signal is carried out in the game console 20 of the manufacturer A. Therefore, the TV 10 only functions as a monitor or a display receiving and displaying the game image controlled or played by the game console of each manufacturer, and there is a limitation in actively functioning in the playing of the game image of the user.

In order to provide the user with an experience of controlling game content via the large-sized screen, the TV may be more active for the user, beyond a passive function of receiving and displaying the game image from the game console. To do this, the TV 10 may organically manage the game console of each manufacturer and the controller of each manufacturer. Therefore, according to one or more embodiments, provided is a method of connecting a controller of an arbitrary manufacturer to the TV 10, and actively converting and transferring the control signal transmitted from the connected controller of the manufacturer into a code that may be understood by the game console of each manufacturer or each source so that the control signal may be transferred to a game console of an arbitrary manufacturer or an arbitrary source such as a server computer.

Figure 2:
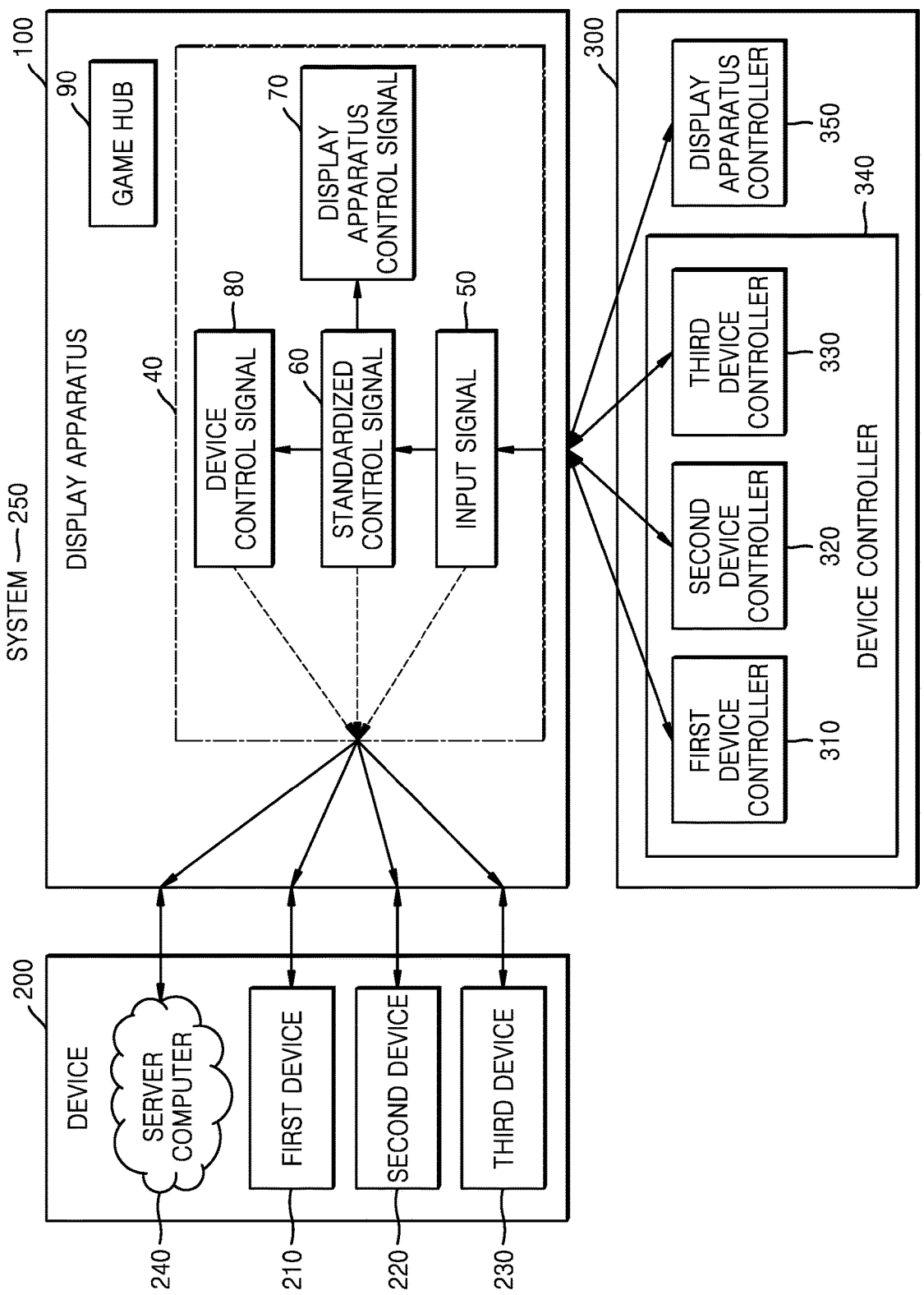
FIG. 2 is a diagram showing a system including a display apparatus, a device, and a device controller, according to an embodiment of the disclosure.

FIG. 2 is a diagram showing a system including a display apparatus, a device, and a device controller according to an embodiment of the disclosure.

Referring to FIG. 2, a system 250 may include a display apparatus 100, a device 200, and a controller 300.

The device 200 is an electronic apparatus connected to the display apparatus 100 through wires or wirelessly to transmit/receive data and/or content, for example, may transfer game content to the display apparatus 100. The device 200, of course, may transfer video content and/or audio content rather than the game content.

The device 200 may be any type of device that may be connected to the display apparatus 100 to transmit/receive data, for example, may include a first device 210, a second device 220, a third device 230, and a server computer 240.

The first device 210, the second device 220, and the third device 230 may be located around the display apparatus 100, and may be connected through wires to the display apparatus 100 via a high-definition multimedia interface (HDMI), etc. or may be wirelessly connected to the display apparatus 100 via Wi-Fi or Bluetooth that is a near field communication technology. The first device 210, the second device 220, and the third device 230 may include, for example, an external input device that is connected to the display apparatus 100 via a cable, etc. to provide images via wired communication. The external input device may include, for example, various types of electronic devices that may provide the display apparatus 100 with content, such as a set-top box, a DVD player, a blue-ray disc player, a PC, a game machine, etc. The external input device and the display apparatus 100 may be connected to each other via various connection units, and perform content transmission/reception. The various connection units may include, for example, a cable, and the external input device and the display apparatus 100 may include one or more ports for cable connection. One or more ports may include, for example, a digital input interface such as an HDMI port, a display port, type-C, etc. For example, the first device 210 and the display apparatus 100 may each include an HDMI port and perform communication via the ports.

For example, the first device 210, the second device 220, and the third device 230 may be game-content dedicated devices such as a game console. However, the first device 210, the second device 220, and the third device 230 are not limited to the game console, but may be any type of devices providing various content such as game content, movie content, video content, etc.

The first device 210 is a device manufactured by a first manufacturer and may directly communicate with a first device controller 310 manufactured by the first manufacturer, but may not directly communicate with a second device controller 320, a third device controller 330, and a display apparatus controller 350. That is, the first device 210 may not interpret control signals transmitted from the second device controller 320 or the third device controller 330 manufactured by another manufacturer, and thus, is difficult to directly communicate with the second device controller 320 or the third device controller 330. Also, because there may be a plurality of versions for the device and the controller, the device and the controller may not be compatible with each other even when they are manufactured by the same manufacturer. The device and the device controller that are not compatible with each other may not directly communicate with each other. The direct communication denotes that the device may receive and process an input signal directly from the device controller as it is.

The second device 220 is a device manufactured by a second manufacturer and may directly communicate with a second device controller 320 manufactured by the second manufacturer, but may not directly communicate with the first device controller 310, the third device controller 330, and the display apparatus controller 350.

The third device 230 is a device manufactured by a third manufacturer and may directly communicate with the third device controller 330 manufactured by the third manufacturer, but may not directly communicate with the first device controller 310, the second device controller 320, and the display apparatus controller 350.

The server computer 240 is a device connected to the display apparatus 100 via Internet, and may or may not directly communicate with one of the first device controller 310, the second device controller 320, and the third device controller 330 according to an application executed on the server computer 240. The server computer 240 may directly receive and process a control signal from one of the first device controller 310, the second device controller 320, and the third device controller 330 that are compatible with the application executed on the server computer 240. For example, when the application executed on the server computer 240 and the device controller are manufactured by the same manufacturer, the corresponding application and the device controller may be compatible.

The controller 300 may include a device controller 340 and the display apparatus controller 350.

The device controller 340 may be any type of device that may transmit/receive a control signal after connecting to the display apparatus 100, and may include, for example, the first device controller 310, the second device controller 320, and the third device controller 330.

The first device controller 310, the second device controller 320, and the third device controller 330 may be connected to the display apparatus 100 via various wireless communication methods. The various wireless communications may include, for example, Wi-Fi communication, Bluetooth communication, infrared-ray communication.

The first device controller 310 is a device manufactured by the first manufacturer, and thus, may directly communicate with the first device 210, but may not directly communicate with the second device 220, the third device 230, and the server computer 240.

The second device controller 320 is a device manufactured by the second manufacturer, and thus, may directly communicate with the second device 220, but may not directly communicate with the first device 210, the third device 230, and the server computer 240.

The third device controller 330 is a device manufactured by the third manufacturer, and thus, may directly communicate with the third device 230, but may not directly communicate with the first device 210, the second device 220, and the server computer 240.

The display apparatus controller 350 is a device for remotely controlling the display apparatus 100, and thus, may directly communicate with the display apparatus 100, but may not directly communicate with the first device 210, the second device 220, the third device 230, and the server computer 240.

The display apparatus 100 may denote an apparatus that includes a display and displays image content, video content, game content, graphic content, etc. The display apparatus 100 may output or display images or content received from the device 200. The display apparatus 100 may include various types of electronic devices that may receive and output content, for example, various smart devices such as a network TV, a smart TV, an Internet TV, a Web TV, an internet protocol (IP) TV, a personal computer (PC), and a smartphone. The display apparatus 100 may be referred to as the display apparatus in an aspect of receiving and displaying content, and otherwise, may be referred to as a content receiving apparatus, a sync apparatus, an electronic device, a computing device, etc.

The display apparatus 100 may receive a control signal from the display apparatus controller 350 that remotely controls the display apparatus 100, and may perform an operation corresponding to the received control signal. For example, the display apparatus 100 may receive from the display apparatus controller 350 a control signal for controlling channels, volume, and movement of items or menus included in a graphical user interface displayed on the display of the display apparatus 100, and may perform an operation corresponding to the received control signal.

The display apparatus 100 may be connected to the device controller 300 via wireless communication, in order to receive a control signal from the device controller 300. The wireless communication may include, for example, Bluetooth communication, Wi-Fi communication, infrared ray communication, etc.

The display apparatus 100, according to an embodiment, may provide a game hub 90 for providing users with more convenient game environment. The game hub 90 may represent a platform for providing the users with more convenient game play environment by using the display apparatus 100. In addition, the platform, that is, the game hub 90, may include one or more applications, data, and one or more graphic user interfaces for providing the user with the game play environment.

According to an embodiment of the disclosure, the game hub 90 may include a graphic user interface so as to select a source for providing the game content for playing game content. For example, the game hub 90 may include a graphic user interface allowing the device included in the device 200, that is, one of the server computer 240, the first device 210, the second device 220, and the third device 230 to be selected as a source for providing game content. Also, the game hub 90 may include a graphic user interface for controlling or selecting environment of the display apparatus 100 for playing the game content.

According to an embodiment of the disclosure, the display apparatus 100 may provide a conversion function 40. The conversion function 40 may include functions of receiving an input signal 50 from the controller 300, converting the input signal 50 into a standardized control signal 60, converting the standardized control signal 60 into a device control signal 80, or converting the standardized control signal 60 into a display apparatus control signal 70. The display apparatus 100 may process the control signal converted according to the conversion function 40 and provide the processed control signal to an appropriate source. The source may denote a device providing the display apparatus 100 with content.

According to an embodiment of the disclosure, when receiving the input signal 50 from the controller 300, the display apparatus 100 may identify whether the controller transmitting the input signal 50 is the device controller 340. In addition, when it is identified that the controller transmitting the input signal 50 is the device controller 340, the display apparatus 100 may convert the input signal 50 into the standardized control signal 60. The standardized control signal may include a control signal which is defined according to a specified standard. The standardized control signal may be referred as control signal in the present disclosure.

The standardized control signal may include a control signal according to one normalized signal system for commonly managing different input signals according to different code systems from various device controllers. When it is identified that the controller transmitting the input signal 50 is not the device controller 340, that is, the controller is the display apparatus controller 350, the input signal 50 is a control signal from the display apparatus controller 350, and thus, the display apparatus 100 may provide the input signal 50 to a module for processing the display apparatus control signal.

According to an embodiment of the disclosure, the display apparatus 100 may convert the input signal 50 from the device controller 340 into the standardized control signal 60. The display apparatus 100 may identify an operation mode of the display apparatus 100, according to an embodiment of the disclosure. According to an embodiment of the disclosure, the operation mode of the display apparatus 100 may include a menu mode in which settings of the display apparatus may be changed and a content play control mode in which content displayed on the display is controlled. According to an embodiment of the disclosure, the display apparatus 100 may identify the operation mode of the display apparatus 100 according to one of the menu mode and the content play control mode.

According to an embodiment of the disclosure, the display apparatus 100 may control the standardized control signal to be processed and transmitted to a control target device, based on the control target device that corresponds to the identified operation mode.

The display apparatus 100 may identify the control target device corresponding to the identified operation mode, according to an embodiment of the disclosure. According to an embodiment of the disclosure, when the identified operation mode is the menu mode, the display apparatus 100 may identify the control target device as the display apparatus. According to an embodiment of the disclosure, when the identified operation mode is the content play control mode, the display apparatus 100 may identify a device executing a content application as the control target device. For example, when the content application is executed on the server computer 240, the control target device may be the content application executed on the server computer 240. For example, when the content application is executed on a device connected to the display apparatus 100, the control target device may be the corresponding device.

According to an embodiment of the disclosure, when the identified operation mode is the menu mode, the display apparatus 100 may convert the standardized control signal 60 into the display apparatus control signal 70, and may provide the display apparatus control signal 70 to the module processing the display apparatus control signal.

According to an embodiment of the disclosure, when the identified operation mode is the content play control mode, the display apparatus 100 may determine whether the content application is compatible with the standardized control signal. According to an embodiment of the disclosure, when the content application is compatible with the standardized control signal, the display apparatus 100 may provide the standardized control signal to the server computer or the device that is the device on which the content application is directly executed. According to an embodiment of the disclosure, when the content application is not compatible with the standardized control signal, the display apparatus 100 may convert the standardized control signal into the device control signal 80 that is understandable by the content application, and may provide the device control signal 80 to the server computer or the device.

According to an embodiment of the disclosure, while the operation mode of the display apparatus is in the content play control mode, the display apparatus 100 may identify whether the standardized control signal that is converted from the input signal from the controller corresponds to a preset key value. In addition, when the standardized control signal corresponds to the preset key value, the display apparatus 100 may control the menu screen for controlling the display apparatus to be displayed on the display, so that the operation mode of the display apparatus may be switched into the menu mode.

According an embodiment of the disclosure, the display apparatus 100 may determine whether a content application corresponding to the content displayed on the display is compatible with the controller that transmits the input signal. In addition, the display apparatus 100 may directly transfer the input signal from the controller to the target device to be controlled, based on that the content application is compatible with the controller.

Figure 3:
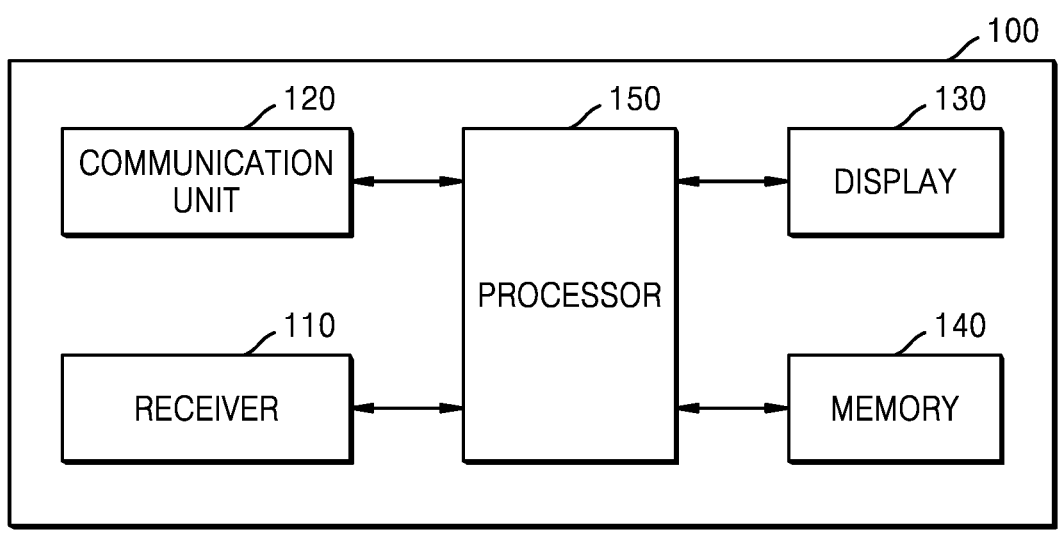
FIG. 3 is a block diagram showing an example of a display apparatus, according to an embodiment of the disclosure.

FIG. 3 is a block diagram showing an example of a display apparatus according to an embodiment of the disclosure.

Referring to FIG. 3, the display apparatus 100 may process and output an image signal and/or audio signal transmitted from the device 200.

The display apparatus 100 may include a receiver 110, a communicator 120, a display 130, a memory, and a processor 150.

The receiver 110 may receive the image signal and/or audio signal from the device 200 according to a connected protocol, based on the control by the processor 150.

The communicator 120, according to the control by the processor 150, may receive the image signal and/or audio signal from the device 200 via a wireless communication protocol.

The display 130 may display, on a screen, the image signal received from the device 200.

The memory 140 may store programs related to the operation of the display apparatus 100 and various data generated during the operation of the display apparatus 100.

The memory 140 may store at least one instruction. Also, the memory 140 may store at least one program executed by the processor 150. Also, the memory 140 may store an application for providing a certain service.

In detail, the memory 140 may include a storage medium of at least one type of a flash memory type, a hard disk type, a multimedia card micro type, a card type memory (e.g., an SD or XD memory, etc.), random access memory (RAM), a static RAM (SRAM), a read-only memory (ROM), an electrically erasable programmable ROM (EEPROM), a programmable (PROM), a magnetic memory, a magnetic disk, and an optical disk.

The processor 150 controls overall operations of the display apparatus 100. For example, the processor 150 may perform the functions of the display apparatus 100 of the disclosure, by executing one or more instructions stored in the memory 140.

In an embodiment of the disclosure, the processor 150 may store one or more instructions in the memory provided therein, and may control the operations of the display apparatus to be performed by executing the one or more instructions stored in the memory provided therein. That is, the processor 150 may perform a certain operation by executing at least one instruction or program stored in the internal memory provided in the processor 150 or the memory 140.

According to an embodiment of the disclosure, the processor 150 may convert the input signal from the device controller into a standardized control signal by executing one or more instructions of the program stored in the memory 140.

According to an embodiment of the disclosure, the processor 150 may identify the operation mode of the display apparatus as one of the menu mode in which the display apparatus is controlled and the content play control mode in which the content displayed on the display is controlled, by executing one or more instructions of the program stored in the memory 140.

According to an embodiment of the disclosure, the processor 150 may control the standardized control signal to be processed and transferred to the control target device based on the control target device corresponding to the identified operation mode, by executing one or more instructions of the program stored in the memory 140.

According to an embodiment of the disclosure, the processor 150 may identify identification information of the device controller by executing the one or more instructions of the program stored in the memory 140, and may convert the input signal from the device controller into the standardized control signal based on a conversion table corresponding to the identification information of the device controller.

According to an embodiment of the disclosure, the processor 150 may identify, by executing the one or more instructions of the program stored in the memory 140, the operation mode as the menu mode because the menu screen for changing settings of the display apparatus is at least partially located in foreground, based on a play screen layer located in the foreground from among the play screen layers displayed on the display, and may identify the operation mode as the content play control mode because the content screen displayed on the display is located in the foreground.

According to an embodiment of the disclosure, the processor 150 may determine the control target device as the display apparatus because the identified operation mode is the menu mode, by executing one or more instructions of the program stored in the memory 140, and may process the standardized control signal to be used in the display apparatus.

According to an embodiment of the disclosure, the processor 150 may convert the standardized control signal into the display apparatus control signal by executing one or more instructions of the program stored in the memory 140, and may control the display apparatus according to the converted display apparatus control signal.

According to an embodiment of the disclosure, the processor 150 may determine the control target device as an external electronic device providing the content displayed on the display because the identified operation mode is the content play control mode, by executing one or more instructions of the program stored in the memory 140, and may process the standardized control signal to be used in the external electronic device.

According to an embodiment of the disclosure, the processor 150 may identify whether the standardized control signal converted from the input signal from the device controller corresponds to the preset key value while the identified operation mode is the content play control mode, by executing one or more instructions of the program stored in the memory 140, and when the standardized control signal corresponds to the preset key value, the processor 150 controls the menu screen for controlling the display apparatus to be displayed on the display so that the display apparatus operates in the menu mode.

According to an embodiment of the disclosure, the processor 150, by executing one or more instructions of the program stored in the memory 140, directly transfers the standardized control signal to the external electronic device based on that the application executing the content displayed on the display is compatible with the standardized control signal, and may convert the standardized control signal by using the conversion table corresponding to the content execution application based on that the application executing the content displayed on the display is not compatible with the standardized control signal, and then, may transfer the converted control signal to the external electronic device.

According to an embodiment of the disclosure, the processor 150 may determine, by executing one or more instructions of the program stored in the memory 140, whether the application executing the content displayed on the display is compatible with the device controller, and when the application executing the content is compatible with the controller, the processor 150 may directly transfer the input signal from the device controller to the external electronic device.

Figure 4:
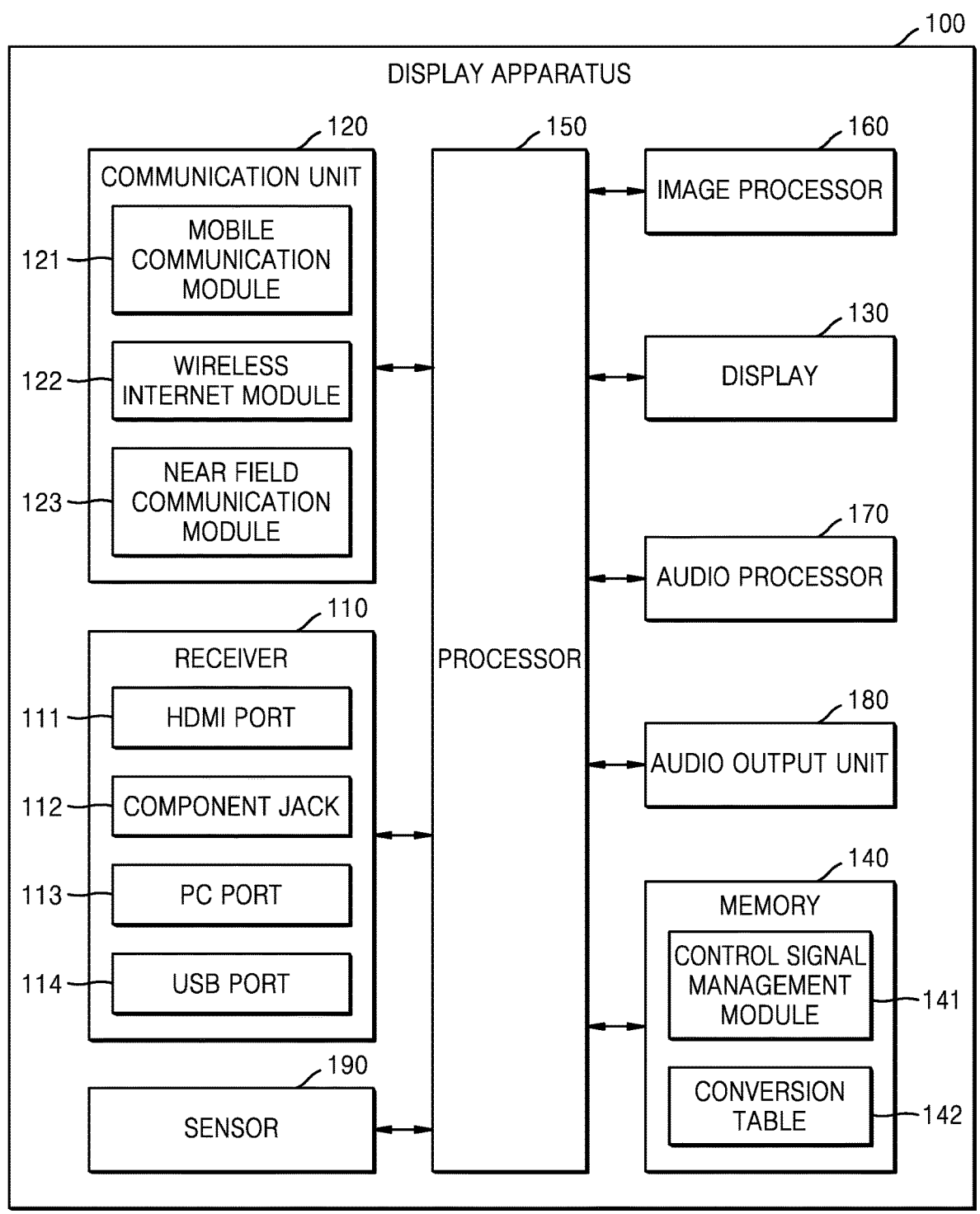
FIG. 4 is a block diagram showing a display apparatus, according to an embodiment of the disclosure.

FIG. 4 is a block diagram showing a display apparatus 100 according to an embodiment of the disclosure in detail.

Referring to FIG. 4, the display apparatus 100 may further include an image processor 160, an audio processor 170, an audio output unit 180, and a sensor 190, in addition to the receiver 110, the communicator 120, the display 130, the memory 140, and the processor 150.

The receiver 110 may receive an image signal and an audio signal received from the device 200 according to a connected protocol based on the control by the processor 150, and then, may output the signals to the image processor 160 and the audio processor 170.

The receiver 110 may receive a video (e.g., moving picture, etc.), audio (e.g., voice, music, etc.), and additional information (e.g., EPG, etc.) from the outside of the display apparatus 100 according to the control by the processor 150. The receiver 110 may include one of an HDMI port 111, a component jack 112, a PC port 113, and a USB port 114, or a combination of one or more thereof. The receiver 110 may further include a display port (DP), a thunderbolt, a mobile high-definition link (MHL), in addition to the HDMI port. For example, the receiver 110 may be connected to one of the first device 210, the second device 220, and the third device 230 via the HDMI port 111 or the USB port 114, and may receive content such as a video or audio from the connected device.

The communicator 120 may include one or more modules enabling wireless communication between the display apparatus 100 and a wireless communication system or between the display apparatus 100 and a network in which another electronic device is located. For example, the communicator 120 may include a mobile communication module 121, a wireless internet module 122, and a short-range communication module 123.

The mobile communication module 121 may transmit/receive a wireless signal to/from at least one of a base station, an external terminal, or a server on a mobile communication network. The wireless signal may include a voice call signal, a video call signal, or various types of data according to transmission/reception of texts/multimedia messages.

The wireless internet module 122 is a module for accessing wireless Internet, and may be built in or out of the device. As a wireless Internet technology, wireless LAN (WLAN), Wi-Fi, wireless broadband (Wibro), world interoperability for microwave access (Wimax), high speed downlink packet access (HSDPA), etc. may be used. The device may perform Wi-Fi peer to peer (P2P) connection with another device through the wireless internet module 122.

The short-range communication module 123 denotes a module for performing short range communication. Examples of the near field communication technology may include Bluetooth, Bluetooth low energy (BLE), radio frequency identification (RFID), infrared data association (IrDA), ultra-wideband (UWB), ZigBee, etc. For example, the communicator 120 may be connected to one of the first device 210, the second device 220, and the third device 230 via one short-range communication module 123, and may receive content such as video, audio, etc. from the connected device.

The image processor 160 may process the image signal transmitted from the receiver 110 or the communicator 120 and output the signal to the display 130, according to the control by the processor 150.

The display 130 may display the image signal transmitted from the image processor 160 on a screen.

The audio processor 170 may convert an audio signal transmitted from the receiver 110 or the communicator 120 into an analog audio signal and output the signal to the audio output unit 180, according to the control by the processor 150.

The audio output unit 180 may output the audio (e.g., voice, sound) input through the communicator 120 or the receiver 110. Also, the audio output unit 180 may output audio stored in the memory 140 according to the control by the processor 150. The audio output unit 180 may include at least one of a speaker, a headphone output terminal, or Sony/Philips digital interface (S/PDIF) output terminal, or a combination thereof.

The sensor 190 senses user voice, user image, or user interaction, and may include a microphone 191, a camera unit 192, and a light receiver 193.

The microphone 191 receives uttered voice of the user. The microphone 191 may convert the received voice into an electrical signal and outputs the electrical signal to the processor 150. The user voice may include, for example, voice corresponding to the menu or function of the display apparatus 100.

The camera unit 192 may receive an image (e.g., successive frames) corresponding to a motion of the user including gesture, within a camera recognition range. The processor 150 may select the menu displayed on the display apparatus 100 by using a result of recognizing the motion or perform a controlling operation corresponding to the result of recognizing the motion.

The light receiver 193 receives an optical signal (including a control signal) from an external control device. The light receiver 193 may receive an optical signal corresponding to a user input (e.g., touch, push, touch gesture, voice, or motion) from the remote-control device. A control signal may be extracted from the optical signal according to the control by the processor 150.

The processor 150 controls overall operations of the display apparatus 100 and signal flow among internal elements of the display apparatus 100, and processes the data. When there is a user input or a stored preset condition is satisfied, the processor 150 may execute an operation system (OS) and various applications stored in the memory 140.

The processor 150 may include a graphic processing unit for processing graphics corresponding to the video. The graphic processing unit may generate a screen including various objects such as icons, image, text, etc. by using a calculator and a rendering unit. The calculator may calculate property values such as a coordinate value on which each object is to be displayed, shape, size, color, etc. according to a screen layout by using a user interaction sensed by the sensing unit. The rendering unit generates screens of various layouts including the objects based on the property values calculated by the calculator.

The memory 140 may store programs related to the operation of the display apparatus 100 and various data generated during the operation of the display apparatus 100.

According to an embodiment of the disclosure, the memory 140 may include a control signal management module 141 and a conversion table 142. The display apparatus 100 may execute the conversion function 40 as described above with reference to FIG. 2 by using the control signal management module 141 and the conversion table 142.

When receiving the input signal from the controller 300, the control signal management module 141 may include one or more instructions for managing the transfer of the input signal from the controller 300 to the target device, with reference to the conversion table 142.

The conversion table 142 may include one or more data structures for converting the input signal transmitted from the controller 300 into the standardized control signal, converting the standardized control signal into each device control signal, or converting the standardized control signal into the display apparatus control signal.

According to an embodiment of the disclosure, the conversion table 142 may include at least one of a table for converting the input signal received from each device controller into the standardized control signal, a table for converting the standardized control signal into each application control signal, or a table for converting the standardized control signal into the display apparatus control signal. The conversion table 142 will be described with reference to FIGS. 5 to 7.

The processor 150 controls overall operations of the display apparatus 100. For example, the processor 150 may perform the functions of the display apparatus 100 disclosed in the disclosure, by executing one or more instructions stored in the memory 140. For example, the processor 150 may perform the conversion function disclosed in the specification by executing one or more instructions included in the control signal management module 141 by referring to the conversion table 142.

Figure 5:
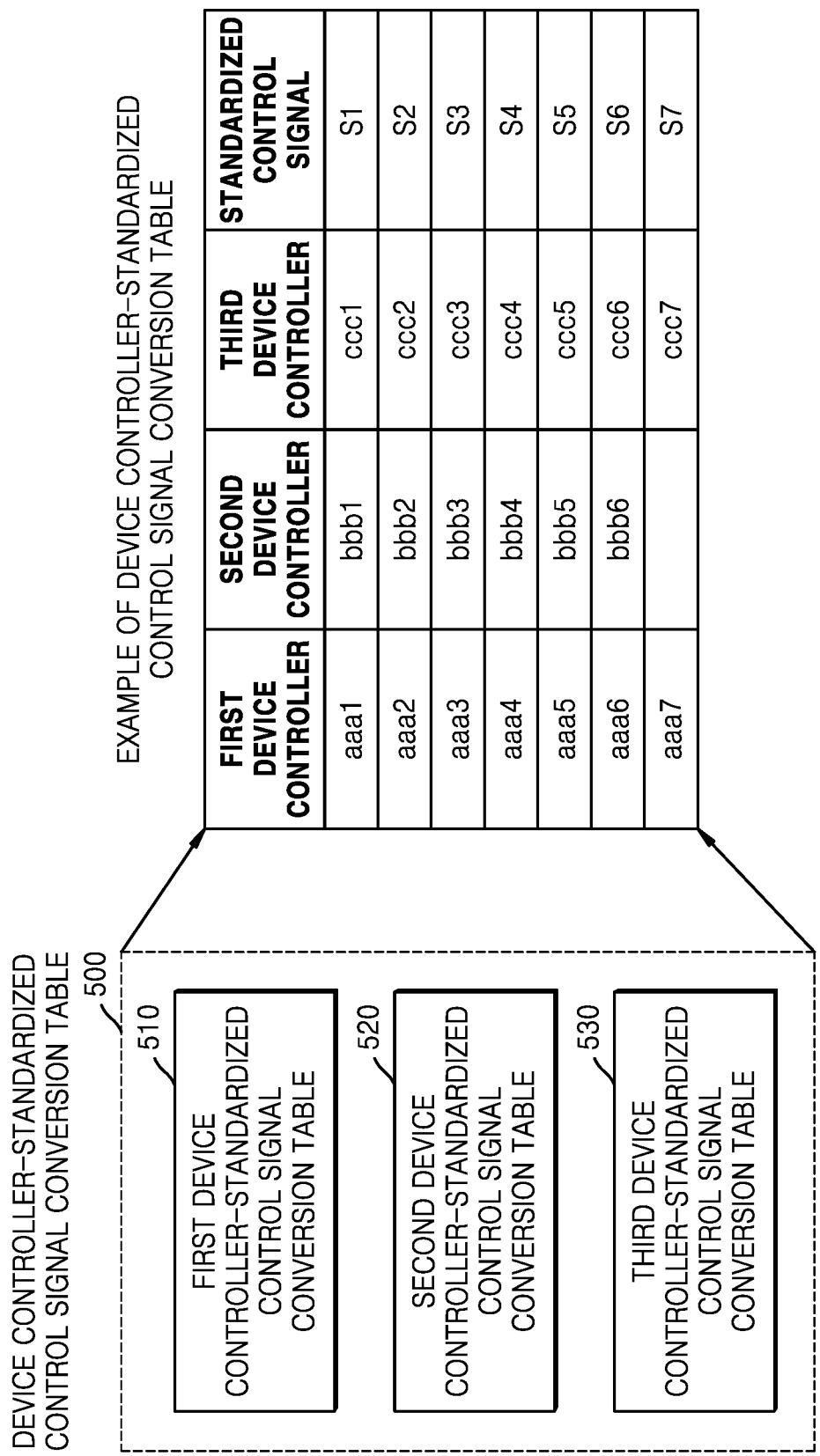
FIG. 5 is a diagram showing an example of a table for converting an input signal from a device controller to a standardized control signal, according to an embodiment of the disclosure.

FIG. 5 is a diagram showing an example of a table for converting an input signal from a device controller to a standardized control signal according to an embodiment of the disclosure.

A device controller-standardized control signal conversion table 500 may include a conversion table corresponding to one or more device controllers. The conversion table may denote a mapping table that may convert the input signal from the device controller into a standardized control signal. "Standardized" in the standardized control signal may not necessarily denote international standard, but may denote a signal list defined by the display apparatus itself, or may denote a signal list defined by the agreement of manufacturers in the field of the display apparatus. The display apparatus 100 may maintain the above conversion table with respect to one or more device controllers managed by itself. The display apparatus 100 may store the conversion table 500 in advance, or may download or update periodically or non-periodically the conversion table from one or more server computers.

Referring to FIG. 5, the device controller-standardized control signal conversion table 500 may include conversion tables corresponding to three device controllers, that is, a first device controller-standardized control signal conversion table 510 capable of converting an input signal from the first device controller into a standardized control signal, a second device controller-standardized control signal conversion table 520 capable of converting an input signal from the second device controller into a standardized control signal, and a third device controller-standardized control signal conversion table 530 capable of converting an input signal from the third device controller into a standardized control signal. The table shown in FIG. 5 is an example, and the display apparatus 100 may include more conversion tables or less conversion tables according to the number of the device controllers managed by the display apparatus 100.

An example of the conversion table 500 is shown in FIG. 5. The first device controller-standardized control signal conversion table 510 may denote a mapping table of values of input signals from the first device controller and values of standardized control signals. Referring to FIG. 5, when the input signal from the first device controller may include values of aaa1, aaa2, aaa3, aaa4, aaa5, aaa6, and aaa7, and the values of the input signal may be mapped respectively to S1, S2, S3, S4, S5, S6, and S7 of the standardized control signal. For example, when the input signal from the first device controller has a value of aaa7, the input signal may be converted into the standardized control signal S7. The second device controller-standardized control signal conversion table 520 may denote a mapping table of values of input signals from the second device controller and values of standardized control signals. Referring to FIG. 5, when the input signal from the second device controller may include values of bbb1, bbb2, bbb3, bbb4, bbb5, and bbb6, and the values of the Input signal may be mapped respectively to S1, S2, S3, S4, S5, and S6 of the standardized control signal. For example, when the input signal from the second device controller has a value of bbb7, the input signal may be converted into the standardized control signal S6. The third device controller-standardized control signal conversion table 530 may denote a mapping table of values of input signals from the third device controller and values of standardized control signals. Referring to FIG. 5, when the input signal from the third device controller may include values of ccc1, ccc2, ccc3, ccc4, ccc5, ccc6, and ccc7, and the values of the input signal may be mapped respectively to S1, S2, S3, S4, S5, S6, and S7 of the standardized control signal. For example, when the input signal from the third device controller has a value of ccc7, the input signal may be converted into the standardized control signal S7.

As described above, the display apparatus 100 may manage systems of input signals transmitted from different device controllers by using a common standardized control signal system, by using a mapping table that converts the input signals from different device controllers into one common standardized control signal. Thus, even when the device controller transmitting the input signal and the content play application are not compatible with each other, the input signal may be conveniently processed.

FIG. 6 is a diagram showing an example of a table for converting a standardized control signal into an application control signal according to an embodiment of the disclosure.

A standardized control signal-application control signal conversion table 600 may include conversion tables corresponding to one or more applications. The conversion table may denote a mapping table that may convert the standardized control signal into a control signal of each application.

The display apparatus 100 may maintain the conversion table with respect to one or more applications. The display apparatus 100 may store the conversion table 600 in advance, or may download or may update periodically or non-periodically the conversion table from one or more server computers.

Referring to FIG. 6, the standardized control signal-application control signal conversion table 600 may include the conversion tables corresponding to three applications, that is, a standardized control signal-first application control signal conversion table 610 capable of converting the standardized control signal into a first application control signal, a standardized control signal-second application control signal conversion table 620 capable of converting the standardized control signal into a second application control signal, and a standardized control signal-third application control signal conversion table 630 capable of converting the standardized control signal into a third application control signal. The table shown in FIG. 6 is an example, and the display apparatus 100 may include more conversion tables or less conversion tables according to the number of the applications managed by the display apparatus 100.

An example of the conversion table 600 is shown in FIG. 6. The standardized control signal-first application control signal conversion table 610 capable of converting the standardized control signal into the first application control signal may denote a mapping table of the values of the standardized control signal and values of the first application control signal. Referring to FIG. 6, the values S1, S2, S3, S4, S5, S6, and S7 of the standardized control signal may be mapped respectively to values aaaa1, aaaa2, aaaa3, aaaa4, aaaa5, aaaa6, and aaaa7 of the first application control signal. For example, the standardized control signal S7 may be converted into the value aaaa7 of the first application control signal. The standardized control signal-second application control signal conversion table 620 capable of converting the standardized control signal into the second application control signal may denote a mapping table of the values of the standardized control signal and values of the second application control signal. Referring to FIG. 6, the values S1, S2, S3, S4, S5, and S6 of the standardized control signal may be mapped respectively to values bbbb1, bbbb2, bbbb3, bbbb4, bbbb5, and bbbb6 of the second application control signal. For example, the standardized control signal S1 may be converted into the value bbbb7 of the second application control signal. The standardized control signal-third application control signal conversion table 630 capable of converting the standardized control signal into the third application control signal may denote a mapping table of the values of the standardized control signal and values of the third application control signal. Referring to FIG. 6, the values S1, S2, S3, S4, S5, S6, and S7 of the standardized control signal may be mapped respectively to values cccc1, cccc2, cccc3, cccc4, cccc5, cccc6, and cccc7 of the third application control signal. For example, the standardized control signal S1 may be converted into the value cccc7 of the third application control signal.

As described above, when a play application of the content displayed on the display apparatus 100 does not support the standardized control signal, that is, the content play application does not analyze or interpret the standardized control signal, the display apparatus 100 converts the signal by using the conversion table shown in FIG. 6, and thus, a control signal that may be interpreted by the content play application may be provided to the content play application even when the standardized control signal and the content play application are not compatible with each other.

In the example of FIG. 6, the conversion table is provided in units of application, but the disclosure is not limited thereto, and the conversion table may be provided in units of device. For example, as shown in FIG. 2, the conversion tables respectively corresponding to the first device, the second device, and the third device may be provided. For example, the display apparatus 100 identifies the device on which the play application of the content displayed on the display apparatus 100 is executed, and when the identified device does not support the standardized control signal, that is, when the identified device may not interpret or understand the standardized control signal, the display apparatus 100 converts the signal by using a standardized control signal-device control signal conversion table so as to provide the control signal that may be interpreted by the device to the device even when the standardized control signal and the identified device are not compatible with each other.

Figure 7:
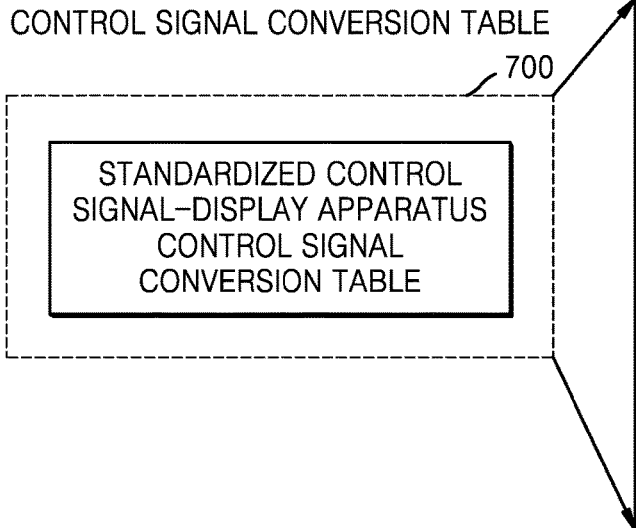
FIG. 7 is a diagram showing an example of a table for converting a standardized control signal into a display apparatus control signal, according to an embodiment of the disclosure.

FIG. 7 is a diagram showing an example of a table for converting a standardized control signal into a display apparatus control signal according to an embodiment of the disclosure.

Referring to FIG. 7, a standardized control signal-display apparatus control signal conversion table 700 may denote a mapping table capable of converting the standardized control signal into a display apparatus control signal.

An example of the conversion table 700 is shown in FIG. 7. The standardized control signal-display apparatus signal conversion table 700 that may convert the standardized control signal into the display apparatus control signal that is used to control the display apparatus may denote a mapping table of the values of the standardized control signal and the values of the display apparatus control signal. Referring to FIG. 7, the values S1, S2, S3, S4, S5, S6, and S7 of the standardized control signal may be mapped respectively to values d1, d2, d3, d4, d5, d6, and d7 of the display apparatus control signal.

As described above, the display apparatus 100 converts the standardized control signal by using the conversion table shown in FIG. 7 in order to use the standardized control signal in controlling of the display apparatus while the display apparatus 100 operates in the menu mode for changing settings of the display apparatus, and thus, the standardized control signal is converted into the display apparatus control signal and the display apparatus may be controlled.

Figure 8:
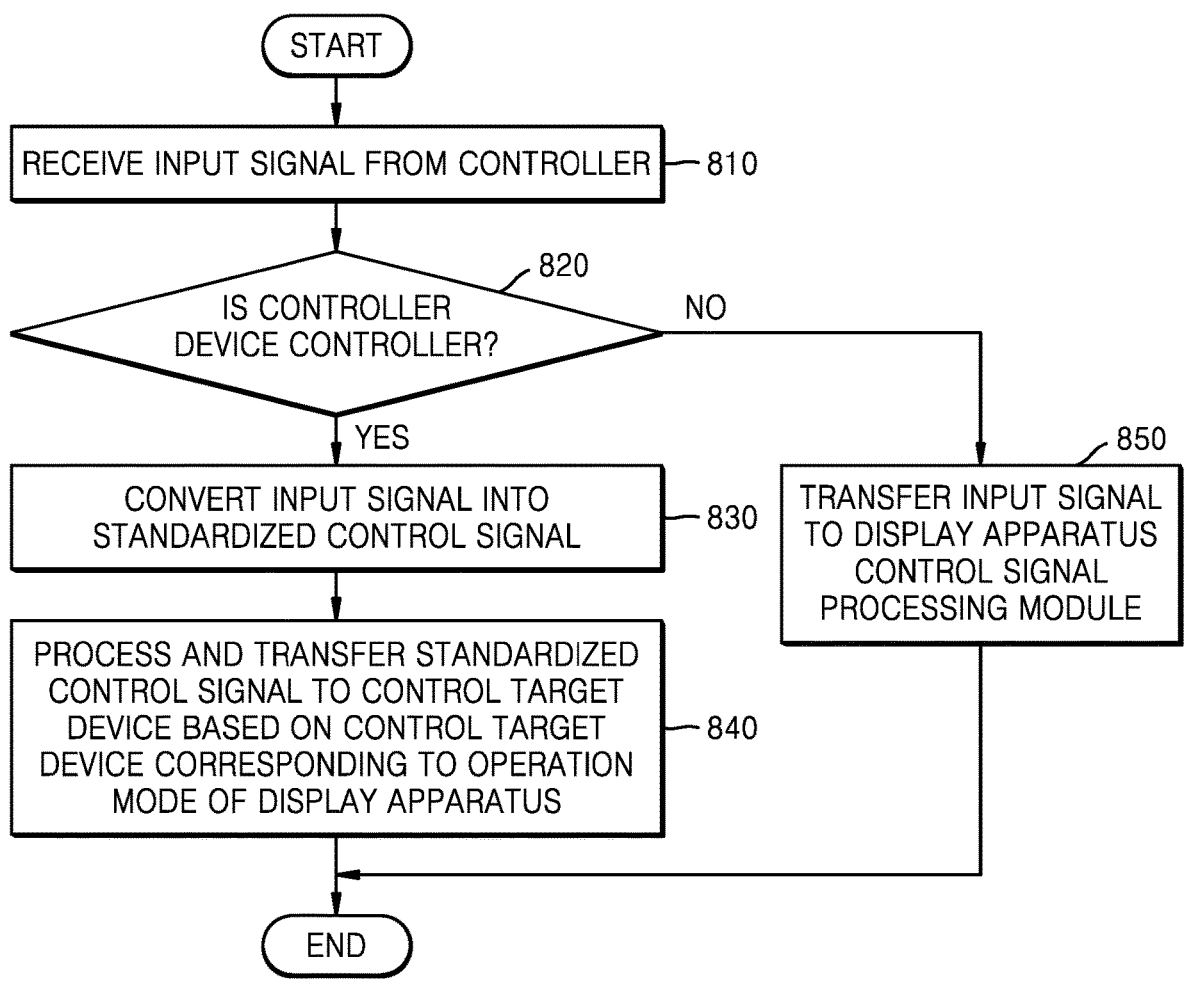
FIG. 8 is a flowchart illustrating an example of the method of operating a display apparatus, according to an embodiment of the disclosure.

FIG. 8 is a flowchart illustrating an example of the method of operating a display apparatus according to an embodiment of the disclosure.

Referring to FIG. 8, in operation 810, the display apparatus 100 may receive an input signal from the controller 300.

The display apparatus 100 according to an embodiment of the disclosure may receive the input signal from the controller 300 by using at least one of the Wi-Fi communication technology, Bluetooth communication technology, IrDA communication technology, or USB communication technology.

In operation 820, the display apparatus 100 may determine whether the controller 300 is a device controller. The display apparatus 100 may receive identification information from the controller 300 when starting communication, by using one of the Wi-Fi communication technology, Bluetooth communication technology, IrDA communication technology, and USB communication technology used to receive the input signal. The display apparatus 100 may determine whether the controller is the device controller based on the identification information of the controller 300.

As a result of determination in operation 820, when the controller is determined as the device controller, operation 830 may be performed.

In operation 830, the display apparatus 100 may convert the input signal into a standardized control signal.

According to an embodiment of the disclosure, the display apparatus 100 may use the device controller-standardized control signal conversion table 500 described above with reference to FIG. 5, when converting the input signal into the standardized control signal.

According to an embodiment of the disclosure, the display apparatus 100 may identify which device controller the controller 300 is, by using the identification information of the controller transmitted from the controller 300. For example, the display apparatus 100 may identify that the controller 300 is the first device controller by using the identification information of the controller.

According to an embodiment of the disclosure, the display apparatus 100 may obtain a conversion table corresponding to the identification information of the controller from the device controller-standardized control signal conversion table 500 by using the identification information of the controller. For example, when the controller 300 is identified as the first device controller, the display apparatus 100 may obtain the conversion table corresponding to the first device controller, that is, the first device controller-standardized control signal conversion table 510, from the device controller-standardized control signal conversion table 500.

According to an embodiment of the disclosure, the display apparatus 100 may convert the input signal into the standardized control signal by using the first device controller-standardized control signal conversion table 510 obtained as above. For example, when the value of the input signal from the first device controller is aaa5, the display apparatus 100 may convert the input signal into the value S5 of the standardized control signal corresponding thereto.

In operation 840, the display apparatus 100 may process and transmit the standardized control signal based on the control target device corresponding to the operation mode of the display apparatus, to the control target device.

According to an embodiment of the disclosure, the display apparatus 100 may identify the operation mode of the display apparatus, because the control target device that would use the input signal is different according to the operation mode of the display apparatus. The operation mode of the display apparatus may include the menu mode for changing settings of the display apparatus itself, and the content play control mode for controlling the play of the content displayed on the display apparatus.

According to an embodiment of the disclosure, the display apparatus 100 determines whether there is a compatibility with the standardized control signal based on the control target device corresponding to the identified operation mode of the display apparatus, and processes the standardized control signal according to the determination result and transmit the processed signal to the control target device. When the operation mode of the display apparatus is the menu mode, the control target device may be the display apparatus itself. When the operation mode of the display apparatus is the content play control mode, the control target device may be the application for executing the content or the device on which the application is located. The application executing the content may be a device connected to the server computer or the display apparatus through wires or wirelessly. Detailed operation in operation 840 will be described below with reference to FIG. 9.

As a result of determination in operation 820, when the controller is not determined as the device controller, operation 850 may be performed.

In operation 850, when the controller transmitting the input signal is not the device controller, that is, is determined as a remote-controller, the display apparatus 100 may transfer the input signal to a module processing the display apparatus control signal because the signal is a signal for directly controlling the display apparatus.

Figure 9:
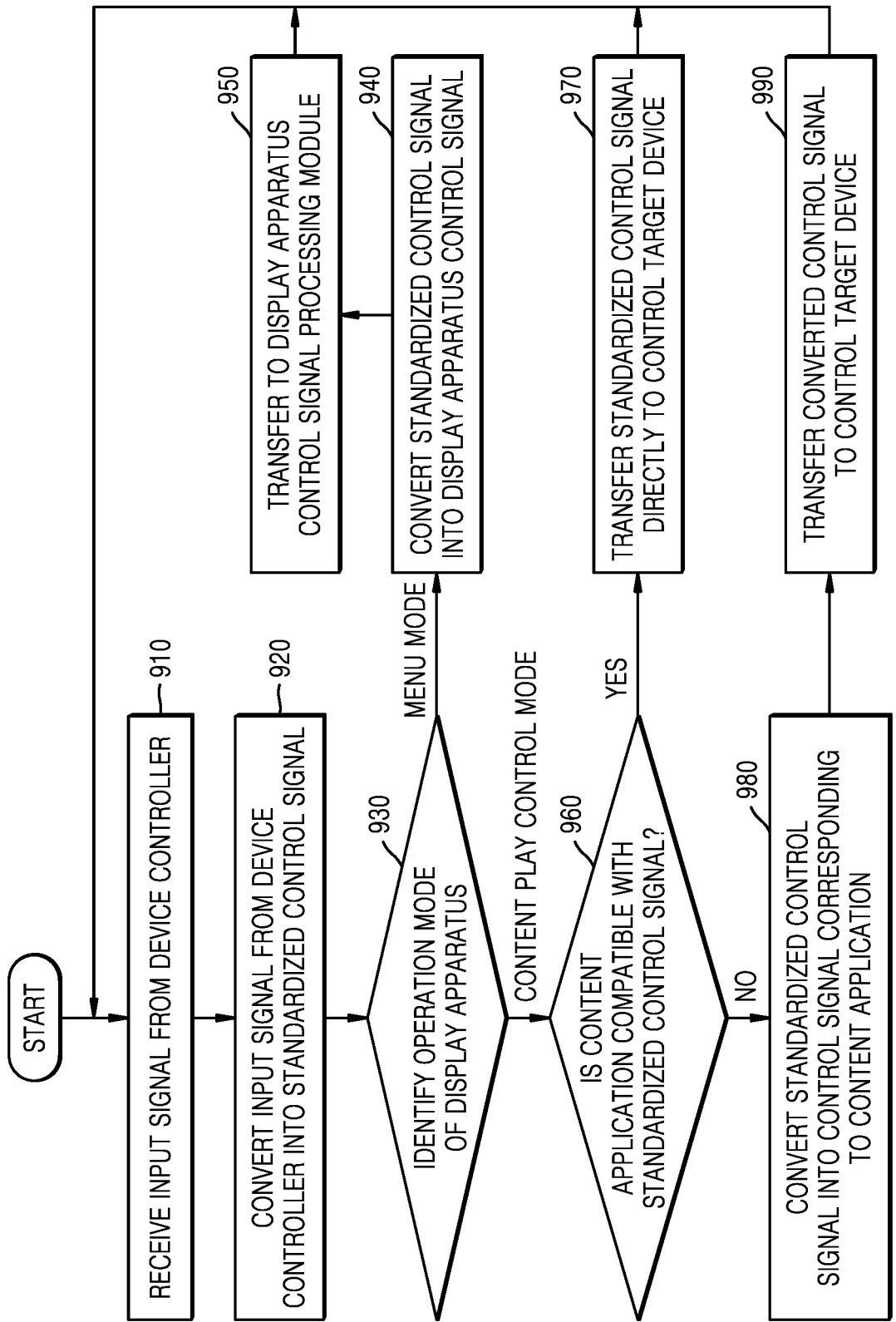
FIG. 9 is a flowchart illustrating an example of a method of operating a display apparatus, according to an embodiment of the disclosure.

FIG. 9 is a flowchart illustrating an example of a method of operating a display apparatus, according to an embodiment of the disclosure.

Referring to FIG. 9, in operation 910, the display apparatus 100 may receive an input signal from the device controller.

In operation 920, the display apparatus 100 may convert the input signal from the device controller into a standardized control signal.

In operation 930, the display apparatus 100 may identify an operation mode of the display apparatus.

According to an embodiment of the disclosure, the display apparatus 100 may identify the operation mode of the display apparatus as one of the menu mode for changing settings of the display apparatus and the content play control mode for controlling the content displayed on the display apparatus. The menu mode may denote an operation mode, in which a menu screen is displayed on the display apparatus so that environmental information or a setting value of the display apparatus may be changed, so that the user may control the display apparatus via the graphic user interface on the menu screen. The settings of the display apparatus may include, for example, content displaying method, resolution of the display screen, audio outputting method. The content play control mode may denote a mode in which controlling operations regarding the play of the content displayed on the display apparatus may be performed. The menu mode and the content play control mode will be described below with reference to FIGS. 10 and 11.

Figure 10:
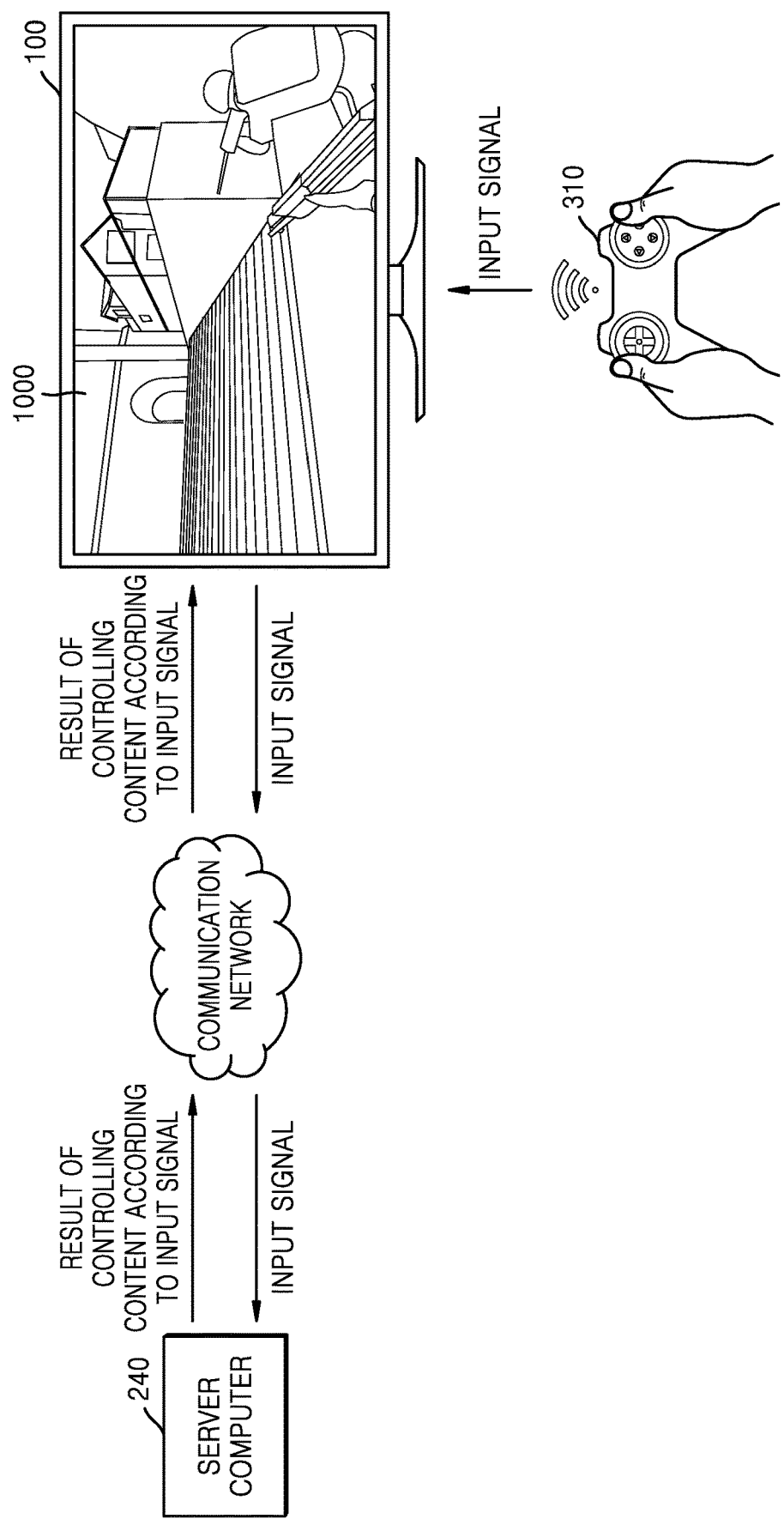
FIG. 10 is a diagram showing an example in which a display apparatus operates in a content-play control mode, according to an embodiment of the disclosure.

FIG. 10 is a diagram showing an example in which a display apparatus operates in a content-play control mode, according to an embodiment of the disclosure.

Referring to FIG. 10, the display apparatus 100 may receive content via a communication network according to an application executed on the server computer 240, and display content 1000. The content displayed on the display apparatus 100 may include video data or graphic data, and may be manipulated according to the control by the user. When the user manipulates the first device controller 310 by using a manipulation button of the first device controller 310, a manipulation signal is input as an input signal of the display apparatus 100, and the display apparatus 100 may transfer the input signal to the server computer 240 via the communication network. The server computer 240 may parse the input signal and control the content according to the parsed input signal. In addition, the server computer 240 may transfer a content control result to the display apparatus 100 via the communication network. The display apparatus 100 may display the content control result received from the server computer 240 on the display.

As described above, in the content play control mode of the display apparatus, the display apparatus displays the content and the input signal input to the display apparatus may be used to control the play of the content displayed on the display apparatus.

In the content play control mode, the content may not be only received from the server computer 240 as shown in FIG. 10, but also received from the devices connected to the display apparatus 100, for example, the first to third devices shown in FIG. 2. Also, the display apparatus 100 may display the content stored in the memory thereof.

Figure 11:
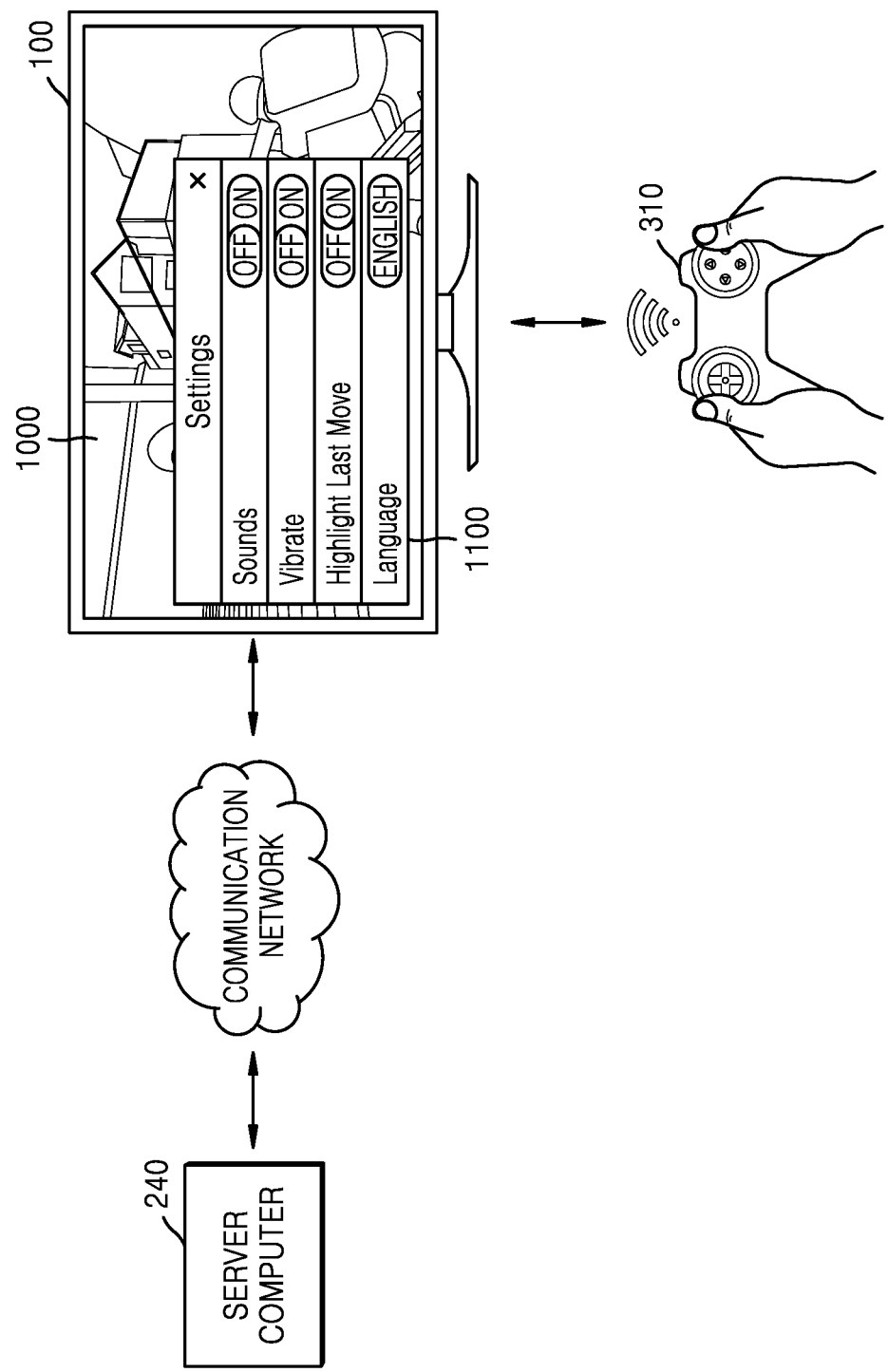
FIG. 11 is a diagram showing an example in which a display apparatus operates in a menu mode, according to an embodiment of the disclosure.

FIG. 11 is a diagram showing an example in which a display apparatus operates in a menu mode, according to an embodiment of the disclosure.

Referring to FIG. 11, the display apparatus 100 may display a menu screen 1100 for changing or selecting the environment or settings of the display apparatus 100.

When the user manipulates the first device controller 310 by using a manipulation button of the first device controller 310, a manipulation signal is input as an input signal of the display apparatus 100, and the display apparatus 100 may control the menu screen 1100 based on the input signal and perform an operation of changing of selecting the environment or setting corresponding to the user input. The menu screen 11100 may include menus for adjusting sound of the display apparatus, changing language used in the display apparatus, adjusting graphic displayed on the display apparatus, controlling resources used in the display apparatus, account management, etc.

As described above, in the menu mode of the display apparatus, the display apparatus displays the menu screen, and the input signal input to the display apparatus may be used to control one or more items in the menu screen displayed on the display apparatus.

Referring back to FIG. 9, the display apparatus 100 may identify the operation mode of the display apparatus as one of the menu mode and the content play control mode.

According to an embodiment of the disclosure, the display apparatus 100, based on the screen layer located in the foreground from among the screen layers displayed on the display, may identify the operation mode as the menu mode because the menu screen for controlling the display apparatus is located in at least some of the foreground, and may identify the operation mode as the content play control mode otherwise.

Figure 12:
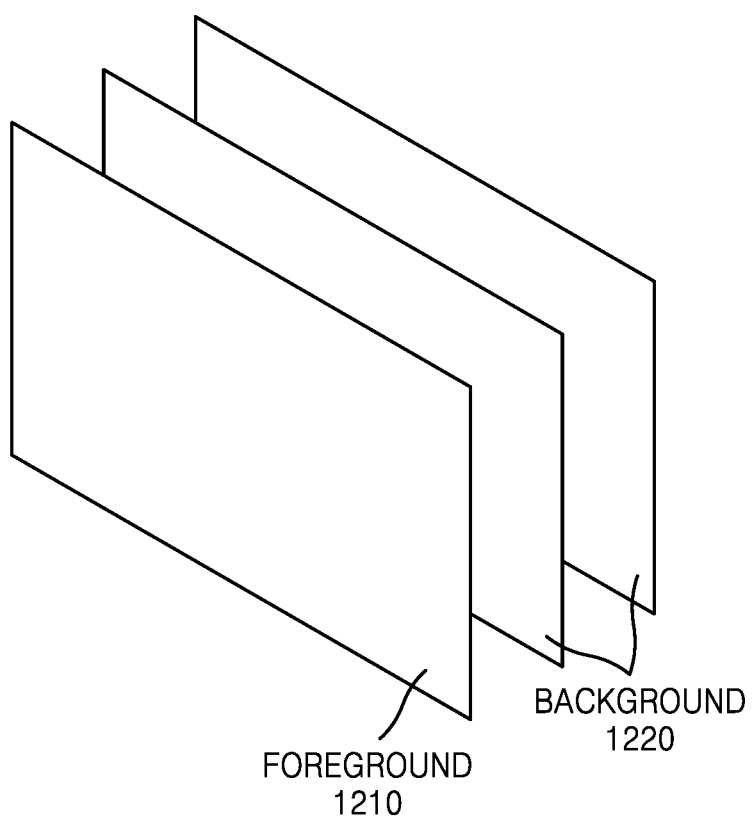
FIG. 12 is a reference diagram for describing a foreground and background screen layers, according to an embodiment of the disclosure.

FIG. 12 is a reference diagram for describing a foreground and background screen layers according to an embodiment of the disclosure.

Referring to FIG. 12, the display apparatus 100 may display a window corresponding to one of more screen layers on the display. Each screen layer may correspond to an application execution screen, a video screen, or a menu screen. One or more screen layers may be displayed on the display while overlapping one another, partially overlapping one another, or without overlapping one another. From among the screen layers, a foreground layer 1210 may denote a layer that is completely displayed on the top of the screen without being interfered with by or overlapping with another screen layer. From among the screen layers, the other layers than the foreground layer may be represented as background layers 1220.

The display apparatus 100 may determine whether the screen layer located in the foreground layer, from among the screen layers displayed on the display, is a menu screen. The display apparatus 100 may identify the operation mode of the display apparatus as the menu mode when the menu screen is at least partially located in the foreground, and otherwise, may identify the operation mode as the content play control mode.

As a result of identifying the operation mode of the display apparatus, when the operation mode is the menu mode, operation 940 is performed, and when the operation mode is the content play control mode, operation 960 may be performed.

In operation 940, the display apparatus 100 may convert the standardized control signal into a display apparatus control signal. That is, because the current operation mode of the display apparatus 100 is the menu mode, the display apparatus 100 may convert the standardized control signal into the display apparatus control signal in order to use the input signal received from the device controller in controlling of the display apparatus.

According to an embodiment of the disclosure, the display apparatus 100 may convert the standardized control signal into the display apparatus control signal by using the standardized control signal-display apparatus control signal conversion table as shown in FIG. 7. For example, when the standardized control signal has a value of S5, the display apparatus 100 may obtain a value d5 of the display apparatus control signal mapping to S5, referring to the standardized control signal-display apparatus control signal conversion table 700.

In operation 950, the display apparatus 100 may transfer the display apparatus control signal to a display apparatus control signal module. The display apparatus control signal processing module may perform an operation corresponding to the display apparatus control signal. For example, when the display apparatus control signal indicates a command for increasing volume of the display apparatus, the display apparatus control signal processing module may control an audio output unit so as to increase the volume of the display apparatus.

When the operation mode of the display apparatus is the content play control mode, operation 960 may be performed. When the operation mode of the display apparatus is the content play control mode, the display apparatus 100 may perform an operation for using the input signal transmitted from the device controller in the controlling of the content play.

In operation 960, the display apparatus 100 may determine whether the content execution application is compatible with the standardized control signal. The content execution application may denote an application of executing the content displayed on the display apparatus 100. The content execution application may be located on the display apparatus 100, a server computer, or a device connected to the According to an embodiment of the disclosure, the display apparatus 100 may obtain identification information of the content execution application through a communication with the server computer or communication with the device connected to the display apparatus 100, when starting to display the content on the display apparatus 100.

Figure 13:
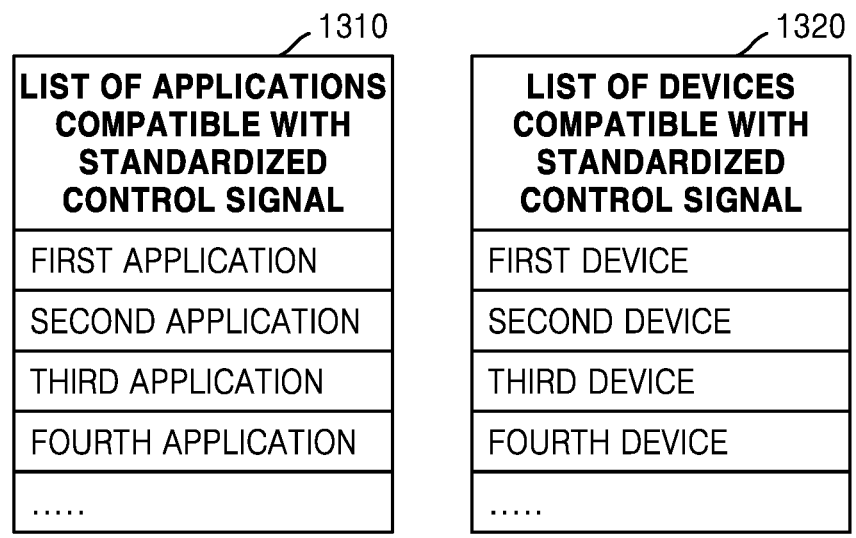
FIG. 13 is a diagram showing an example of a list of applications that are compatible with a standard control signal and a list of devices that are compatible with a standard control signal, according to an embodiment of the disclosure.

According to an embodiment of the disclosure, the display apparatus 100 may determine whether the content execution application is compatible with the standardized control signal based on the identification information of the content execution application, for example, by using a list of applications that are compatible with the standardized control signal as shown in FIG. 13.

FIG. 13 is a diagram showing an example of a list of applications that are compatible with a standard control signal and a list of devices that are compatible with a standard control signal, according to an embodiment of the disclosure.

Referring to FIG. 13, the display apparatus 100 may store and manage an application list 1310 that is compatible with the standardized control signal. The application list 1310 compatible with the standardized control signal may include an application identifier as information about one or more applications that are compatible with the standardized control signal. The application that is compatible with the standardized control signal may denote that the application may receive an input of the standardized control signal, and then, may understand and process the standardized control signal. The display apparatus 100 may store, download from one or more server computers, or periodically or non-periodically update the application list compatible with the standardized control signal.

The display apparatus 100 may store and manage a device list 1320 that is compatible with the standardized control signal, in addition to or instead of the application list 1310 compatible with the standardized control signal. The device list 1320 compatible with the standardized control signal may include a device identifier as information about one or more devices that are compatible with the standardized control signal. The device that is compatible with the standardized control signal may denote that the device may receive an input of the standardized control signal, and then, may understand and process the standardized control signal. The display apparatus 100 may store, download from one or more server computers, or periodically or non-periodically update the device list compatible with the standardized control signal.

In operation 960 of FIG. 9, it is described that the display apparatus 100 determines whether the content execution application is compatible with the standardized control signal, but according to an embodiment of the disclosure, the display apparatus 100 may determine whether the device on which the content execution application is located is compatible with the standardized control signal. The display apparatus 100 may determine whether the device is compatible with the standardized control signal, with reference to a device list 1320 compatible with the standardized control signal as shown in FIG. 13.

According to the determination in operation 960, when it is determined that the content execution application is compatible with the standardized control signal, operation 970 is performed, and when it is determined that the content execution application is not compatible with the standardized control signal, operation 980 may be performed.

In operation 970, the display apparatus 100 may transfer the standardized control signal directly to the control target device.

According to an embodiment of the disclosure, when the content execution application is compatible with the standardized control signal, the display apparatus 100 may directly transfer the standardized control signal to the control target device. The control target device denotes a device on which the content execution application is located. When the display apparatus 100 receives and display the content from an application executed on the server computer, the control target device may be a server computer. When the display apparatus 100 receives and displays content from an application executed on a device connected to the display apparatus 100, the control target device may be the corresponding device. Because the content execution application may interpret the standardized control signal, the display apparatus 100 may transfer the standardized control signal to the control target device as it is.

According to the determination in operation 960, when it is determined that the content execution application is not compatible with the standardized control signal, operation 980 may be performed.

In operation 980, the display apparatus 100 may convert the standardized control signal to a control signal corresponding to the content execution application.

Even when the standardized control signal is provided to the content execution application in a case where the content execution application is not compatible with the standardized control signal, the content execution application may not interpret the standardized control signal. Thus, the display apparatus 100 may provide the signal after converting the signal into the signal that may be interpreted by the content execution application.

According to an embodiment of the disclosure, the display apparatus 100 may convert the standardized control signal into an application control signal by using the standardized control signal-application control signal conversion table 600 as shown in FIG. 6. For example, when the standardized control signal has a value S3 and the content execution application is the second application, the display apparatus 100 may obtain a value bbbb3 of the application control signal corresponding to the value S3.

In operation 900, the display apparatus 100 may transfer the converted control signal to the control target device. When the display apparatus 100 receives and display the content from an application executed on the server computer, the control target device may be a server computer. When the display apparatus 100 receives and displays content from an application executed on a device connected to the display apparatus 100, the control target device may be the corresponding device.

In FIG. 9, when it is determined that the content execution application is not compatible with the standardized control signal according to the determination in operation 960, the display apparatus 100 may convert the standardized control signal into a control signal corresponding to the content execution application. According to another example, when it is determined that the content execution application is not compatible with the standardized control signal, the display apparatus 100 may not convert the standardized control signal into the control signal corresponding to the content execution application, and may determine whether the content execution application is compatible with the input signal from the device controller. That is, even though the content execution application is not compatible with the standardized control signal, when the content execution application is compatible with the input signal, the content execution application is in a state of directly processing the input signal, and thus, the input signal may be directly provided to the content execution application. For example, in the example shown in FIG. 2, when the display apparatus 100 receives and displays the content of the application executed on the first device 210 and receives the input signal from the first device controller 310 that is manufactured by the same manufacturer of the first device 210, the first device 210 is compatible with the first device controller 310. The first device 210 may directly receive and process the input signal from the first device controller 310. The application executed on the first device 210 may not be compatible with the standardized control signal. Therefore, in this circumstance, because the application executed on the first device 210 is not compatible with the standardized control signal and is compatible with the input signal from the first device controller 310, the display apparatus 100 may directly transfer the input signal to the first device 210 without converting the standardized control signal into the device control signal.

Figure 14:
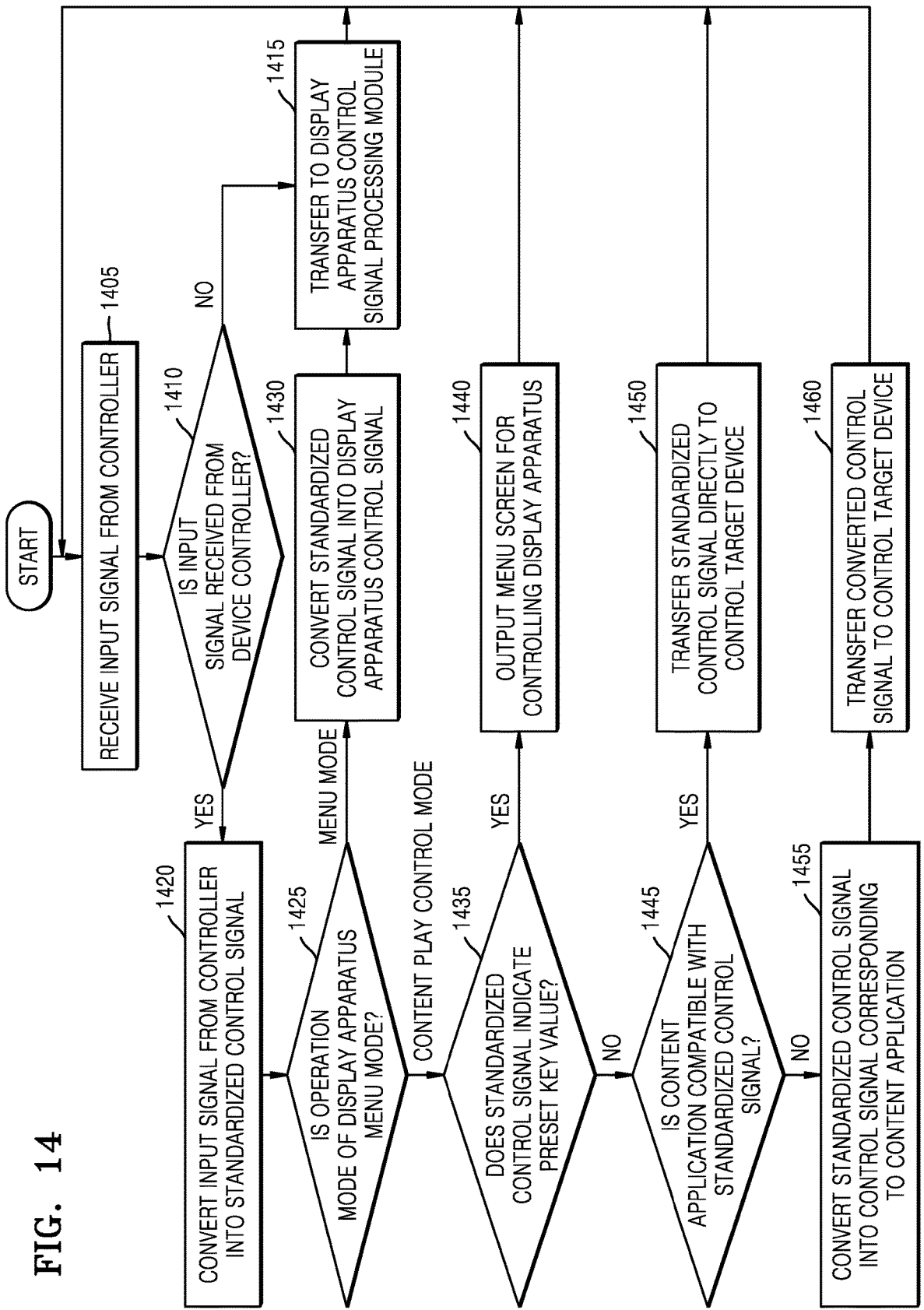
FIG. 14 is a flowchart illustrating an example of a method of operating a display apparatus, according to an embodiment of the disclosure.

FIG. 14 is a flowchart illustrating an example of a method of operating a display apparatus, according to an embodiment of the disclosure.

Referring to FIG. 14, in operation 1405, the display apparatus 100 may receive an input signal from the controller 300.

The display apparatus 100 according to an embodiment of the disclosure may receive the input signal from the controller 300 by using at least one of the Wi-Fi communication technology, Bluetooth communication technology, IrDA communication technology, or USB communication technology.

In operation 1410, the display apparatus 100 may determine whether the input signal is received from the device controller. The display apparatus 100 may receive identification information from the controller 300 when starting communication, by using one of the Wi-Fi communication technology, Bluetooth communication technology, IrDA communication technology, and USB communication technology used to receive the input signal. The display apparatus 100 may determine whether the controller is the device controller based on the identification information of the controller 300.

As a result of determination in operation 1410, when the controller is not determined as the device controller, operation 1415 may be performed.

In operation 1415, when the controller transmitting the input signal is not the device controller, that is, is determined as a remote-controller, the display apparatus 100 may transfer the input signal to a module processing the display apparatus control signal because the signal is a signal for directly controlling the display apparatus.

As a result of determination in operation 1410, when the controller is determined as the device controller, operation 1420 may be performed.

In operation 1420, the display apparatus 100 may convert the input signal into a standardized control signal.

According to an embodiment of the disclosure, the display apparatus 100 may use the device controller-standardized control signal conversion table 500 described above with reference to FIG. 5, when converting the input signal into the standardized control signal.

According to an embodiment of the disclosure, the display apparatus 100 may identify which device controller the controller 300 is, by using the identification information of the controller transmitted from the controller 300. For example, the display apparatus 100 may identify that the controller 300 is the first device controller by using the identification information of the controller.

According to an embodiment of the disclosure, the display apparatus 100 may obtain a conversion table corresponding to the identification information of the controller from the device controller-standardized control signal conversion table 500 by using the identification information of the controller. For example, when the controller 300 is identified as the first device controller, the display apparatus 100 may obtain the conversion table corresponding to the first device controller, that is, the first device controller-standardized control signal conversion table 510, from the device controller-standardized control signal conversion table 500.

According to an embodiment of the disclosure, the display apparatus 100 may convert the input signal into the standardized control signal by using the first device controller-standardized control signal conversion table 510 obtained as above. For example, when the value of the input signal from the first device controller is aaa5, the display apparatus 100 may convert the input signal into the value S5 of the standardized control signal corresponding thereto.

In operation 1425, the display apparatus 100 may identify whether the operation mode of the display apparatus is the menu mode or the content play control mode.

According to an embodiment of the disclosure, the display apparatus 100 may identify the operation mode of the display apparatus as one of the menu mode for controlling the display apparatus and the content play control mode for controlling the content displayed on the display apparatus. The menu mode may denote an operation mode, in which a menu screen is displayed on the display apparatus so that environmental information or a setting value of the display apparatus may be changed, so that the user may control the display apparatus via the graphic user interface on the menu screen. The content play control mode may denote a mode in which controlling operations regarding the play of the content displayed on the display apparatus may be performed.

As a result of identifying the operation mode of the display apparatus, when the operation mode is the menu mode, operation 1430 is performed, and when the operation mode is the content play control mode, operation 1435 may be performed.

In operation 1430, the display apparatus 100 may convert the standardized control signal into a display apparatus control signal. That is, because the current operation mode of the display apparatus 100 is the menu mode, the display apparatus 100 may convert the standardized control signal into the display apparatus control signal in order to use the input signal received from the device controller in controlling of the display apparatus.

According to an embodiment of the disclosure, the display apparatus 100 may convert the standardized control signal into the display apparatus control signal by using the standardized control signal-display apparatus control signal conversion table as shown in FIG. 7. For example, when the standardized control signal has a value of S5, the display apparatus 100 may obtain a value d5 of the display apparatus control signal mapping to S5, referring to the standardized control signal-display apparatus control signal conversion table 700.

In operation 1415, the display apparatus 100 may transfer the display apparatus control signal to a display apparatus control signal module. The display apparatus control signal processing module may perform an operation corresponding to the display apparatus control signal. For example, when the display apparatus control signal indicates a command for increasing volume of the display apparatus, the display apparatus control signal processing module may control an audio output unit so as to increase the volume of the display apparatus.

When the operation mode of the display apparatus is the content play control mode, operation 1435 may be performed.

In operation 1435, the display apparatus 100 may determine whether the standardized control signal indicates a preset key value. This is because, when the preset key value is selected by the device controller while the display apparatus operates in the content play control mode, the selection may be switched to the menu mode. For example, while the display apparatus operates in the content play control mode, when a home key, etc., e.g., of the device controller is pushed, this may be used as a command for displaying the menu screen.

As a result of determination in operation 1435, when the standardized control signal indicates a preset key value, operation 1440 is performed, and otherwise, operation 1445 may be performed.

In operation 1440, the display apparatus 100 may output the menu screen for controlling the display apparatus, as the standardized control signal indicates the preset key value.

Through the output of the menu screen, the display apparatus 100 may be switched from the content play control mode to the menu mode, and the input signal received later may be used to control the display apparatus.

In operation 1445, the display apparatus 100 may determine whether the content execution application is compatible with the standardized control signal. The content execution application may denote an application of executing the content displayed on the display apparatus 100. The content execution application may be located on the display apparatus 100, a server computer, or a device connected to the According to an embodiment of the disclosure, the display apparatus 100 may obtain identification information of the content execution application through a communication with the server computer or communication with the device connected to the display apparatus 100, when starting to display the content on the display apparatus 100.

According to an embodiment of the disclosure, the display apparatus 100 may determine whether the content execution application is compatible with the standardized control signal based on the identification information of the content execution application, for example, by using a list of applications that are compatible with the standardized control signal as shown in FIG. 13.

According to an determination in operation 1445, when it is determined that the content execution application is compatible with the standardized control signal, operation 1450 is performed, and when it is determined that the content execution application is not compatible with the standardized control signal, operation 1455 may be performed.

In operation 1450, the display apparatus 100 may transfer the standardized control signal directly to the control target device.

According to an embodiment of the disclosure, when the content execution application is compatible with the standardized control signal, the display apparatus 100 may directly transfer the standardized control signal to the control target device. The control target device denotes a device on which the content execution application is located. When the display apparatus 100 receives and display the content from an application executed on the server computer, the control target device may be a server computer. When the display apparatus 100 receives and displays content from an application executed on a device connected to the display apparatus 100, the control target device may be the corresponding device. Because the content execution application may interpret the standardized control signal, the display apparatus 100 may transfer the standardized control signal to the control target device as it is.

According to the determination in operation 1445, when it is determined that the content execution application is not compatible with the standardized control signal, operation 1455 may be performed.

In operation 1455, the display apparatus 100 may convert the standardized control signal to a control signal corresponding to the content execution application.

Even when the standardized control signal is provided to the content execution application in a case where the content execution application is not compatible with the standardized control signal, the content execution application may not interpret the standardized control signal. Thus, the display apparatus 100 may provide the signal after converting the signal into the signal that may be interpreted by the content execution application.

According to an embodiment of the disclosure, the display apparatus 100 may convert the standardized control signal into an application control signal by using the standardized control signal-application control signal conversion table 600 as shown in FIG. 6. For example, when the standardized control signal has a value S3 and the content execution application is the second application, the display apparatus 100 may obtain a value bbbb3 of the application control signal corresponding to the value S3.

In operation 1460, the display apparatus 100 may transfer the converted control signal to the control target device. When the display apparatus 100 receives and display the content from an application executed on the server computer, the control target device may be a server computer. When the display apparatus 100 receives and displays content from an application executed on a device connected to the display apparatus 100, the control target device may be the corresponding device.

Figure 15:
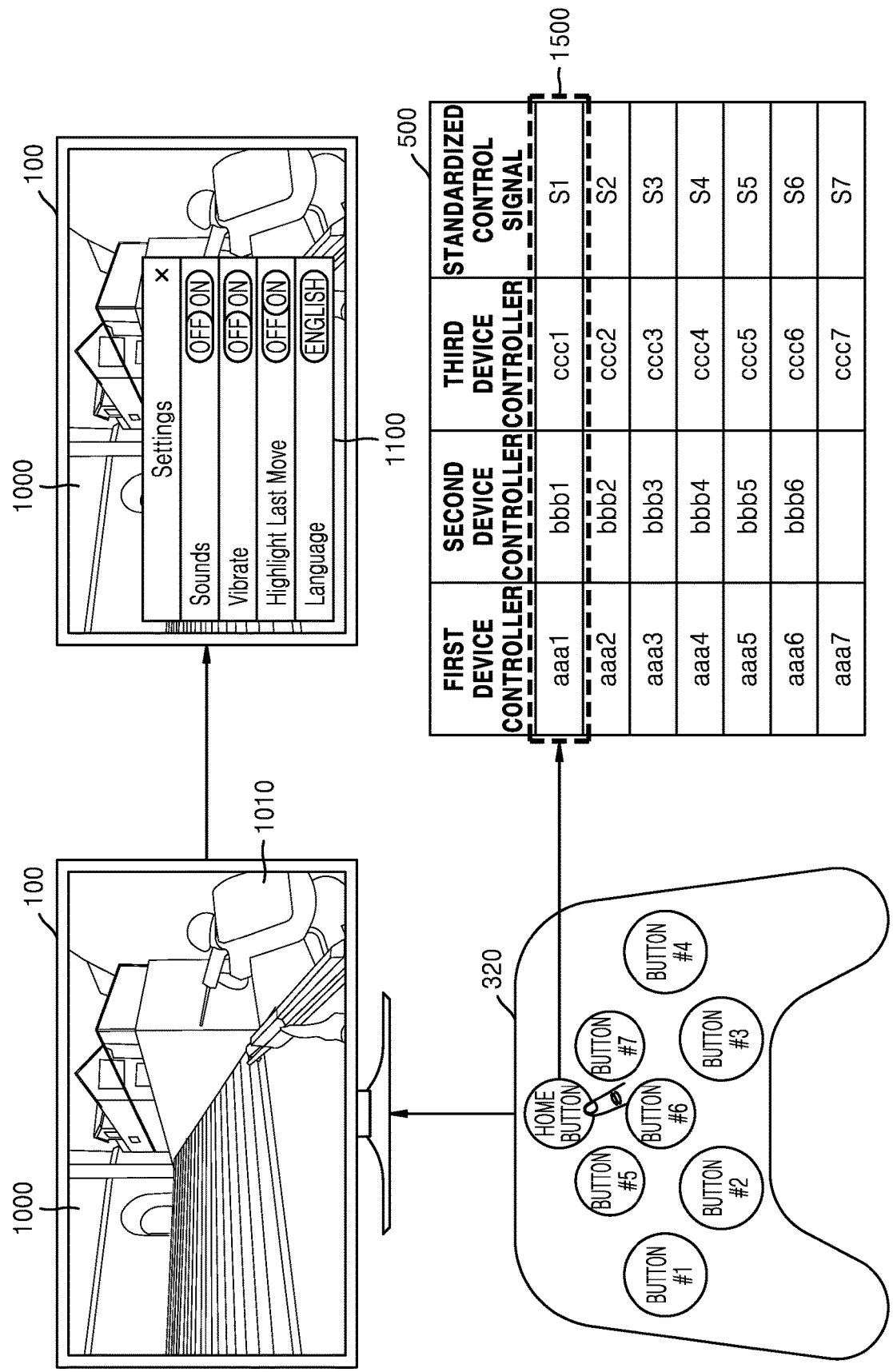
FIG. 15 is a reference diagram for describing an example of switching from a content-play control mode to a menu mode according to a preset key pushed in a display apparatus, according to an embodiment of the disclosure.

FIG. 15 is a reference diagram for describing an example of switching from a content-play control mode to a menu mode according to a preset key pushed in a display apparatus according to an embodiment of the disclosure.

Referring to FIG. 15, the display apparatus 100 may operate in the content play control mode in which the content is controlled according to the input signal from the second device controller 320 while displaying content 1000. In the content play control mode, the input signal generated when pushing a button of the second device 220 may be used in controlling of the content displayed on the display apparatus 100. For example, the input signal transferred as a first button of the second device is pushed may be used to control a player character 1010 in the content 1000 to fire a gun.

As described above, during operating in the content play control mode, the user may want to change the settings of the display apparatus 100. When the user pushes a preset button, e.g., home button, of the second device 220, the input signal corresponding to the button may be received by the display apparatus 100. The display apparatus 100 may convert a value of the input signal corresponding to the home button, e.g., bbb1, into the standardized control signal S1 by using the device controller-standardized control signal conversion table 500. The display apparatus 100 may output a menu screen 1100 as the standardized control signal S1 is the preset key value 1500. As described above, when receiving an input signal from the second device 220 while the menu screen 1100 is output, the display apparatus 100 may use the input signal received from the second device 220 in controlling the menu items on the menu screen 1100 according to the menu mode.

Figure 16:
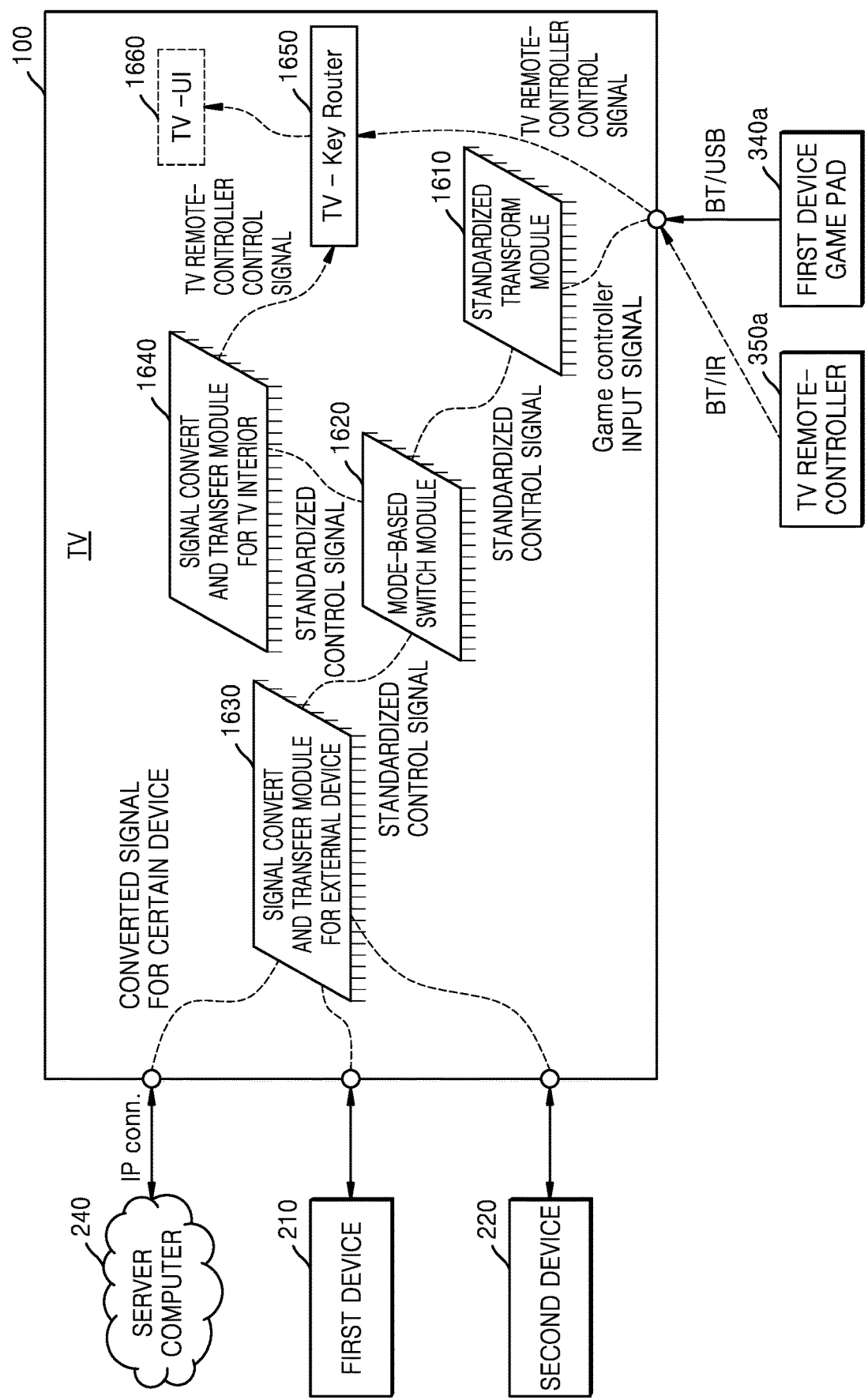
FIG. 16 is a diagram showing an example of a TV as an example of an electronic device, according to an embodiment of the disclosure.

FIG. 16 is a diagram showing an example of a television (TV) as an example of an electronic device, according to an embodiment of the disclosure.

Referring to FIG. 16, a TV that is an example of the display apparatus 100 may include a standardized transform module 1610, a mode-based switch module 1620, a signal convert and transfer module for external device 1630, a signal convert and transfer module for TV interior 1640, a TV key router, and a TV UI processing module 1660.

The standardized transform module 1610 may convert the input signal received by the TV into a standardized control signal. For example, the standardized transform module 1610 may convert the input signal into the standardized control signal with reference to the device controller-standardized control signal conversion table 500 shown in FIG. 5.

The mode-based switch module 1620 identifies whether the operation mode of the TV is the menu mode or content play control mode, and may transfer the standardized control signal according to the identified mode. When the identified mode is a menu mode, the standardized control signal is transferred to the signal convert and transfer module for TV interior 1640, and when the identified mode is the content play control mode may be transferred to the signal convert and transfer module for external device 1630.

The signal convert and transfer module for external device 1630 may directly transfer the received standardized control signal to the external device, or may convert the standardized control signal into a control signal that may be interpreted by the external device and transfer to the external device. The signal convert and transfer module for external device 1630 determines whether the application executing the content displayed on the TV is compatible with the standardized control signal, and then, when being compatible, the signal convert and transfer module for external device 1630 directly transfers the standardized control signal, and when not being compatible, converts the standardized control signal into the control signal that may be interpreted by the application executing the content, and then, transfers the control signal to the external device on which the application executing the content is located.

The signal convert and transfer module for TV interior 1640 may convert the standardized control signal into a TV remote-controller control signal, and may transfer the TV remote-controller control signal to the TV key router 1650.

The TV key router 1650 interprets the TV remote-controller control signal and may transfer the control signal to the TV UI processing module 1660.

The TV UI processing module 1660 may control the UI according to the received signal so that an operation corresponding to the input signal may be performed.

A TV remote-controller 350a or a first device game pad 340a may transfer an input signal to the TV.

The TV remote-controller 350a may be connected to the TV via Bluetooth or IR communication, and the first device game pad 340a may be connected to the TV via Bluetooth or USB communication.

Also, the server computer 240 may be connected to the TV by using Internet protocol, and the first device 210 and the second device 220 may be each connected to the TV via wired/wireless communication. The wired communication may include HDMI or USB communication, and the wireless communication may include BT communication.

When the TV receives an input signal, that is, a TV remote-controller control signal, from the TV remote-controller 350a, the TV may transfer the input signal to the TV key router 1650.

When the TV receives an input signal from the first device game pad 340a, the input signal is the device controller input signal, and thus, the TV may transfer the input signal to the standardized transform module 1610. The standardized transform module 1610 may convert the input signal into a standardized control signal with reference to the device controller-standardized control signal conversion table 500 corresponding to the first device, and then, may transfer the standardized control signal to the mode-based switch module 1620.

The mode-based switch module 1620 may receive the standardized control signal from the standardized transform module 1610 and identifies the operation mode of the TV, and then, when the operation mode is the menu mode for controlling the TV menu, the mode-based switch module 1620 may transfer the standardized control signal to the signal convert and transfer module for TV interior 1640. In addition, when the operation mode is the content play control mode for controlling a game play, the mode-based switch module 1620 may transfer the standardized control signal to the signal convert and transfer module for external device 1630.

The signal convert and transfer module for external device 1630 may determine whether the application executing the content that is currently displayed on the TV is compatible with the standardized control signal.

According to an example, when the application executing the game content currently displayed on the TV is compatible with the standardized control signal and the application is located on the server computer 240, the signal convert and transfer module for external device 1630 may directly transfer the standardized control signal to the server computer 240.

According to an example, when the application executing the game content currently displayed on the TV is not compatible with the standardized control signal and the application is located on the server computer 240, the signal convert and transfer module for external device 1630 may convert the standardized control signal into a control signal that may be interpreted by the application by using the conversion table as shown in FIG. 6 and then may transfer the device control signal to the server computer 240.

According to an example, when the application executing the game content currently displayed on the TV is compatible with the standardized control signal and the application is located on the first device 210, the signal convert and transfer module for external device 1630 may directly transfer the standardized control signal to the first device 210.

According to an example, when the application executing the game content currently displayed on the TV is compatible with the standardized control signal and the application is located on the second device 220, the signal convert and transfer module for external device 1630 may directly transfer the standardized control signal to the second device 220.

According to an example, when the application executing the game content currently displayed on the TV is not compatible with the standardized control signal and the application is located on the second device 220, the signal convert and transfer module for external device 1630 may convert the standardized control signal into a control signal that may be interpreted by the second device (or application) by using the conversion table as shown in FIG. 6 and then may transfer the device control signal to the second device 220.

Some embodiments of the disclosure may be embodied in a storage medium including instruction codes executable by a computer or processor such as a program module executed by the computer. The computer-readable storage medium may be any available medium that may be accessed by a computer, and includes volatile and non-volatile media and removable and non-removable media. Also, the computer-readable medium may include both a computer storage medium. The computer storage medium may include volatile and non-volatile media and removable and non-removable media that are implemented using any method or technology for storing information, such as computer-readable instructions, a data structure, a program module, or other types of data.

In addition, an embodiment of the disclosure may be implemented as S/W programs including instructions stored in a computer-readable storage medium.

A computer is a device capable of fetching instructions stored in a storage medium and operating according to the instructions, and may include the electronic device according to an embodiment of the disclosure.

The computer-readable storage medium may be provided in the form of a non-transitory storage medium. The term "non-transitory" simply denotes that the storage medium is a tangible device, and does not include a signal, but this term does not differentiate between where data is semi-permanently stored in the storage medium and where the data is temporarily stored in the storage medium.

Also, the control method according to one or more embodiments of the disclosure may be provided to be included in a computer program product. The computer program product may be traded between a seller and a buyer as a product.

The computer program product may include a S/W program, or a computer-readable storage medium on which the S/W program is stored. For example, the computer program product may include a product (e.g., a downloadable app) in the form of a S/W program that is electronically distributed through a device manufacturer or an electronic market (e.g., Google Play Store or App Store). For electronic distribution, at least a part of a S/W program may be stored in a storage medium or temporarily generated. The storage medium may include a server of a manufacturer, a server of an electronic market, or a storage medium of a relay server that temporarily stores a S/W program.

The computer program product may include a storage medium of a server or a storage medium of a device in a system including the server and the device. Alternatively, when there is a third device (e.g., smartphone) communicating with the server or the device, the computer program product may include a storage medium of the third device. Alternatively, the computer program product may include a S/W program itself that is transferred from the server to the device or the third device, or from the third device to the device.

One of the server, the device, and the third device may execute the computer program product to perform the method according to one or more embodiments of the disclosure. Alternatively, two or more of the server, the device, and the third device may execute the computer program product to implement the method according to an embodiment of the disclosure in a distributed manner.

For example, the server (e.g., a cloud server, an AI server, etc.) may execute the computer program product stored in the server, and may control the device communicating with the server to execute the method according to an embodiments of the disclosure.

In another example, the third device may execute the computer program product and may control the device communicating with the third device to execute the method according to an embodiment of the disclosure. When the third device execute the computer program product, the third device downloads the computer program product from the server and executes the computer program product. Alternatively, the third device may execute the computer program product provided in a preloaded state to perform the method according to one or more embodiments of the disclosure.

In addition, the terms such as " . . . unit", etc. provided herein may be realized by a hardware component such as a processor or a circuit, and/or a software component executed via a hardware component such as a processor.

The above description of the disclosure is provided for the purpose of illustration, and it would be understood by those skilled in the art that various changes and modifications may be made without changing technical conception and essential features of the disclosure. An embodiment of the disclosure set forth herein or shown above are to be interpreted in an illustrative and non-limiting sense. For example, each component described to be of a single type can be implanted in a distributed manner. Likewise, components described to be distributed can be implanted in a combined manner.

The scope of the disclosure is defined by the following claims rather than by the detailed description of the embodiments of the disclosure. It shall be understood that all modifications and embodiments conceived from the meaning and scope of the claims and their equivalents are included in the scope of the disclosure.

What is claimed is:

1. A display apparatus comprising:
a display;
a memory configured to store at least one instruction; and
a processor,
wherein the at least one instruction, when executed by the processor, causes the display apparatus to:
convert a first input signal received from a first device controller into a standard control signal;
convert a second input signal received from a second device controller into the standard control signal;
identify whether a control target device is the display apparatus or a game application on a server based on a foreground screen layer displayed on the display;
based on the control target device being the game application on the server, transmit the standard control signal to the cloud game application on the server; and
based on the control target device being the display apparatus, convert the standard control signal to a TV remote control signal to be used in the display apparatus.

2. The display apparatus of claim 1, wherein the at least one instruction, when executed by the processor, causes the display apparatus to:
identify identification information of the first device controller; and
convert the first input signal from the first device controller into the standard control signal based on a specified standard using a conversion table corresponding to the identification information of the first device controller.

3. The display apparatus of claim 1, wherein the at least one instruction, when executed by the processor, causes the display apparatus to:
identify whether the control target device is the display apparatus or the game application on the server based on whether a menu screen for changing settings of the display apparatus is located at least partially in the foreground screen layer;
identify the control target device as the display apparatus based on the menu screen for changing settings of the display apparatus being located at least partially in the foreground screen layer; and
identify the control target device as the game application on the server based on a content screen being displayed in the foreground screen layer.

4. The display apparatus of claim 1, wherein the at least one instruction, when executed by the processor, causes the display apparatus to:
identify the control target device as an external electronic device that provides content displayed on the display based on an operation mode being a content play control mode when a menu screen for changing settings of the display apparatus is not located in the foreground screen layer; and process the standard control signal to the external electronic device.

5. The display apparatus of claim 4, wherein the at least one instruction, when executed by the processor, causes the display apparatus to:
based on the identified operation mode being the content play control mode, identify whether the standard control signal converted from the first input signal of the first device controller corresponds to a preset key value; and
based on the standard control signal corresponding to the preset key value, control the menu screen for changing settings of the display apparatus to operate in a menu mode.

6. The display apparatus of claim 4, wherein the at least one instruction, when executed by the processor, causes the display apparatus to:
transmit the standard control signal to the external electronic device based on an application executing the content displayed on the display being compatible with the standard control signal; and
convert the standard control signal using a conversion table corresponding to the application executing the content and transmit the converted standard control signal to the external electronic device, based on the application executing the content displayed on the display not being compatible with the standard control signal.

7. The display apparatus of claim 4, wherein the at least one instruction, when executed by the processor, causes the display apparatus to:
identify whether an application executing the content displayed on the display is compatible with the first device controller; and
transmit the first input signal from the first device controller to the external electronic device based on the application executing the content being compatible with the first device controller.

8. A method of operating a display apparatus, the method comprising:
converting a first input signal from a first device controller into a standard control signal;
converting a second input signal received from a second device controller into the standard control signal;
identifying whether a control target device is the display apparatus or a game application on a server based on a foreground screen layer displayed on a display;
based on the control target device being the game application on the server, transmit the standard control signal to the game application on the server; and
based on the control target device being the display apparatus, convert the standard control signal to a TV remote control signal to be used in the display apparatus.

9. The method of claim 8, further comprising:
identifying identification information of the first device controller; and
converting the first input signal from the first device controller into the standard control signal based on a specified standard using a conversion table corresponding to identification information of the first device controller.

10. The method of claim 8, further comprising identifying whether the control target device is the display apparatus or the game application on the server based on whether a menu screen for changing settings of the display apparatus is located at least partially in the foreground screen layer;

identifying the control target device as the display apparatus based on the menu screen for changing settings of the display apparatus being located at least partially in the foreground screen layer; and
identifying the control target device as the game application on the server based on a content screen being displayed in the foreground screen layer.

11. The method of claim 8, further comprising:
identifying the control target device as an external electronic device that provides content displayed on the display, based on an operation mode being a content play control mode when a menu screen for changing settings of the display apparatus is not located in the foreground screen layer; and
processing the standard control signal to be used in the external electronic device.

12. The method of claim 11, further comprising:
based on the identified operation mode being the content play control mode, identifying whether the standard control signal converted from the first input signal of the first device controller corresponds to a preset key value; and
based on the standard control signal corresponding to the preset key value, controlling the menu screen for changing settings of the display apparatus to operate in a menu mode.

13. The method of claim 11, further comprising:
transmitting the standard control signal to the external electronic device based on an application executing the content displayed on the display being compatible with the standard control signal; and
converting the standard control signal using a conversion table corresponding to the application executing the content and transmitting the converted standard control signal to the external electronic device, based on the application executing the content displayed on the display not being compatible with the standard control signal.

14. The method of claim 11, further comprising:
identifying whether an application executing the content displayed on the display is compatible with the first device controller; and
transmitting the first input signal from the first device controller to the external electronic device based on the application executing the content being compatible with the first device controller.

15. A non-transitory computer-readable recording medium having recorded thereon one or more programs executable by a processor of a display apparatus for implementing a method of operating the display apparatus, wherein the method comprises:
converting a first input signal from a first device controller into a standard control signal;
converting a second input signal received from a second device controller into the standard control signal;
identifying whether a control target device is the display apparatus or a game application on a server based on a foreground screen layer displayed on a display;
based on the control target device being the game application on the server, transmitting the standard control signal to the game application on the server; and
based on the control target device being the display apparatus, converting the standard control signal to a TV remote control signal to be used in the display apparatus.

16. A display apparatus comprising:
a memory configured to store at least one instruction; and a processor configured to execute the at least one instruction to:
  convert a first signal into a standardized control signal;
  convert a second signal into the standardized control signal;
  perform a menu mode for changing settings of the display apparatus and a content play control mode for controlling content displayed on a display;
  identify an operation mode of the display apparatus as one of the menu mode for changing settings of the display apparatus based on the standardized control signal corresponding to a preset key value and a menu screen for changing settings of the display apparatus being located at least partially in a foreground, or the content play control mode for controlling the content displayed on the display based on a content screen being displayed in the foreground;
  process the standardized control signal based on a control target device corresponding to the identified operation mode; and
transfer the processed standardized control signal to the control target device.

\* \* \* \* \*